United States Patent
Honkote et al.

(10) Patent No.: US 12,489,399 B2
(45) Date of Patent: Dec. 2, 2025

(54) RESONANT ROTARY CLOCKING FOR SYNCHRONIZED CLOCK SIGNALS

(71) Applicant: Intel Corporation, Santa Clara, CA (US)

(72) Inventors: Vinayak Honkote, Bangalore (IN); Ragh Kuttappa, Philadelphia, PA (US); Satish Yada, Bangalore (IN); Tanay Karnik, Portland, OR (US); Dileep J. Kurian, Bangalore (IN); Jainaveen Sundaram Priya, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 831 days.

(21) Appl. No.: 17/558,515

(22) Filed: Dec. 21, 2021

(65) Prior Publication Data

US 2023/0198468 A1    Jun. 22, 2023

(51) Int. Cl.
*H03B 5/18*    (2006.01)
*G06F 1/12*    (2006.01)

(52) U.S. Cl.
CPC ............. *H03B 5/1852* (2013.01); *G06F 1/12* (2013.01); *H03B 2200/0016* (2013.01); *H03B 2200/0024* (2013.01)

(58) Field of Classification Search
CPC .. H03B 5/1852; H03B 5/1847; H03B 5/1841; H03B 2200/0016; H03B 27/00; H03B 2200/0024; H03K 3/0315; G06F 1/10
See application file for complete search history.

(56) References Cited

U.S. PATENT DOCUMENTS

| | | |
|---|---|---|
| 2008/0150605 A1 | 6/2008 | Chueh et al. |
| 2012/0039366 A1 | 2/2012 | Wood et al. |
| 2012/0286882 A1 | 11/2012 | Wood |
| 2016/0359456 A1 | 12/2016 | Zhang et al. |
| 2018/0102781 A1 | 4/2018 | Shanan |

OTHER PUBLICATIONS

Abbasalizadeh, Soolmaz, and Hossein Miar-Naimi. "Phase transition analysis of dual-mode standing-rotary traveling-wave oscillator." IEEE Transactions on Circuits and Systems I: Regular Papers 65.8 (2017): 2534-2546. (Year: 2017).*
Chan et al., "A Resonant Global Clock Distribution for the Cell Broadband Engine Processor", IEEE Journal of Solid-State Circuits, vol. 44, No. 1, Jan. 2009, pp. 64-72.

(Continued)

*Primary Examiner* — Ryan Johnson
(74) *Attorney, Agent, or Firm* — NICHOLSON DE VOS WEBSTER & ELLIOTT LLP

(57) ABSTRACT

Various embodiments provide apparatuses, systems, and methods for resonant rotary clocking to generate synchronized clock signals. A base die may include a resonant ring structure to form a plurality of rotary traveling wave oscillators (RTWOs) coupled to one another in a rotary oscillator array (ROA). The ROA may provide synchronized clock signals at deterministic phase points that are tapped from the resonant ring structure. Multiple dies may be coupled to the base die (e.g., in a multi-die system) and may receive the tapped clock signals. Other embodiments may be described and claimed.

22 Claims, 33 Drawing Sheets

(56) References Cited

OTHER PUBLICATIONS

Cordero et al., "Clock Distribution Scheme using Coplanar Transmission Lines", Proceedings of the Conference on Design, Automation and Test in Europe, EDAA, 2008, 6 pages.

Friedman, "Clock Distribution Networks in Synchronous Digital Integrated Circuits", Proceedings of the IEEE, vol. 89, No. 5, May 2001, pp. 665-692.

International Search Report and Written Opinion, PCT App. No. PCT/US2022/050133, Mar. 22, 2023, 12 pages.

Kuttappa et al., "Resonant Clock Synchronization With Active Silicon Interposer for Multi-Die Systems", IEEE Transactions on Circuits and Systems-I: Regular Papers, vol. 68, No. 4, Apr. 2021, pp. 1636-1645.

Kuttappa et al., "Robust Low Power Clock Synchronization for Multi-Die Systems", 2019 IEEE/ACM International Symposium on Low Power Electronics and Design (ISLPED), 2019, 6 pages.

O'Mahony et al., "A 10-GHz Global Clock Distribution Using Coupled Standing-Wave Oscillators", IEEE Journal of Solid-State Circuits, vol. 38, No. 11, Nov. 2003, pp. 1813-1820.

Sathe et al., "Resonant Clock Design for a Power-Efficient High-Volume x86-64 Microprocessor", 2012 IEEE International Solid-State Circuits Conference, Feb. 20, 2012, pp. 68-70.

Shan et al., "Resonant Clock Mega-Mesh for the IBM z13TM", 2015 Symposium on VLSI Circuits (VLSI Circuits), 2015, pp. C322-C323.

Shehata et al., "A 184.6-dBc/Hz FoM 100-KHz Flicker Phase Noise Corner 30-GHz Rotary Traveling-Wave Oscillator Using Distributed Stubs in 22-nm FD-SOI", IEEE Solid-State Circuits Letters, vol. 2, No. 9, Sep. 2019, pp. 103-106.

Shehata et al., "A Distributed Stubs Technique to Mitigate Flicker Noise Upconversion in a mm-Wave Rotary Traveling-Wave Oscillator", IEEE Journal of Solid-State Circuits, vol. 56, No. 6, Jun. 2021, pp. 1745-1760.

Teng et al., "Resonant Frequency Divider Design Methodology for Dynamic Frequency Scaling", 2013 IEEE 31st International Conference on Computer Design (ICCD), 2013, pp. 479-482.

Teng et al., "Synchronization Scheme for Brick-based Rotary Oscillator Arrays", Proceedings of the Great Lakes Symposium on VLSI (GLSVSI '12), May 3-4, 2012, pp. 117-122.

Wood et al., "Rotary Traveling-Wave Oscillator Arrays: A New Clock Technology", IEEE Journal of Solid-State Circuits, vol. 36, No. 11, Nov. 2001, pp. 1654-1665.

* cited by examiner

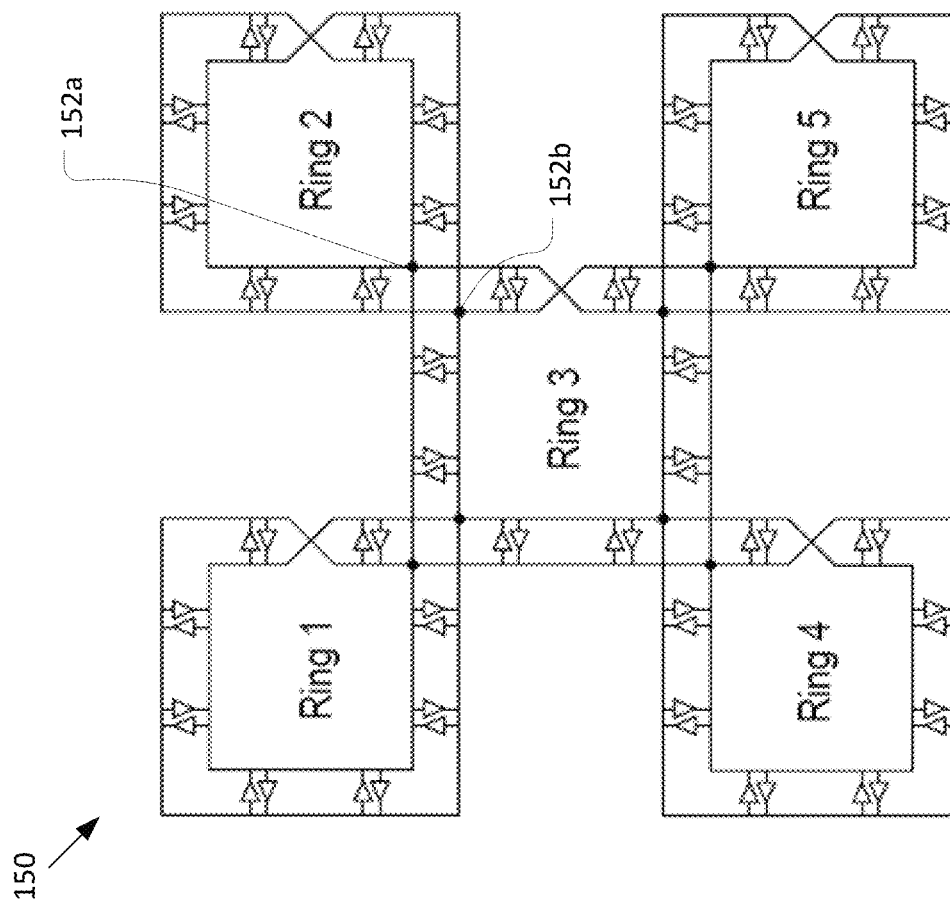
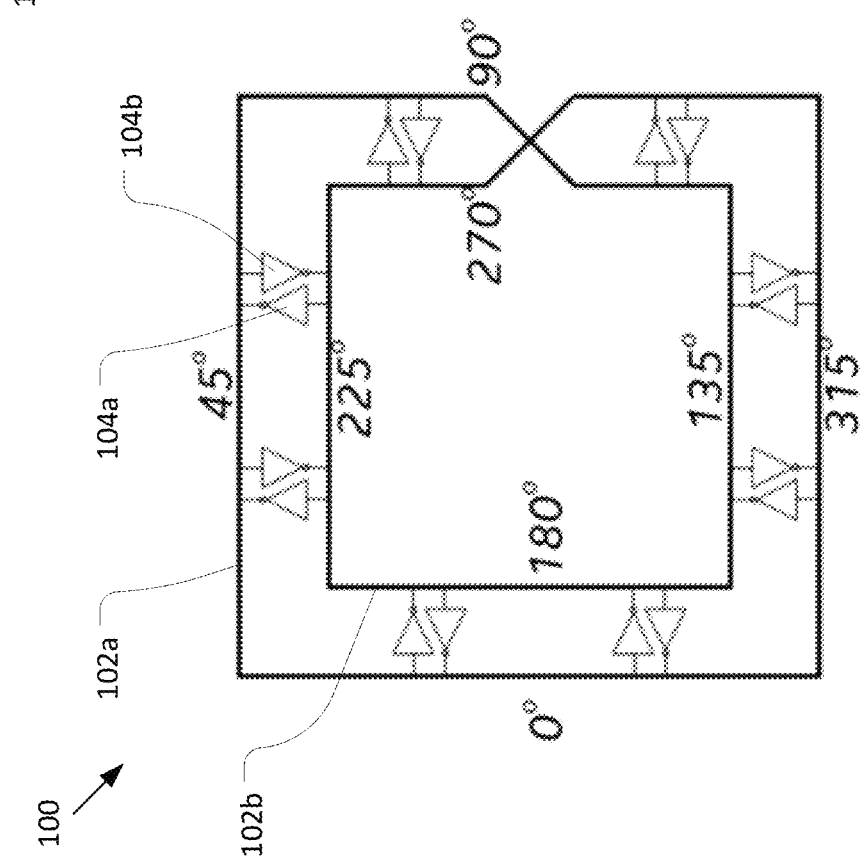
Figure 1A
Figure 1B

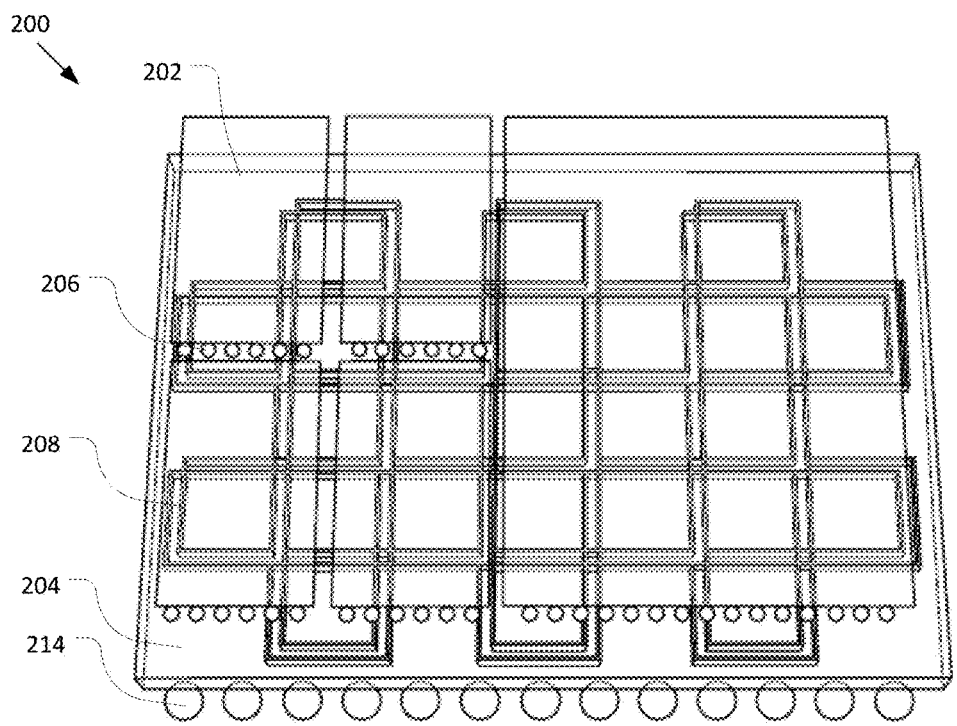
Figure 2A
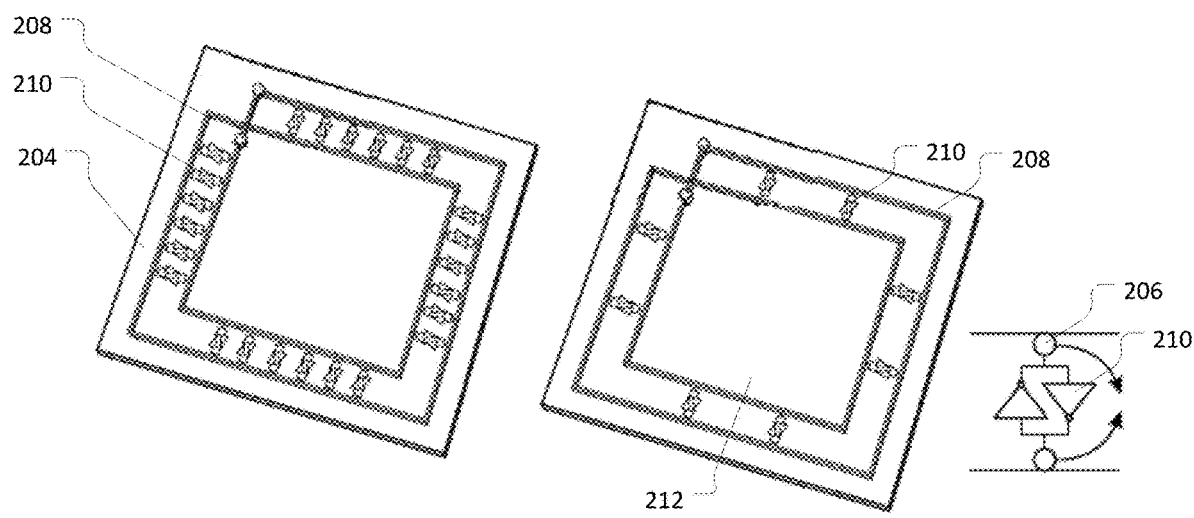
Figure 2B  Figure 2C

RESONANT ROTARY CLOCKING FOR SYNCHRONIZED CLOCK SIGNALS

FIELD

Embodiments of the present invention relate generally to the technical field of electronic circuits, and more particularly to resonant rotary clocking for synchronized clock signals.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

The silicon industry is moving towards die-disintegration and chiplet-based systems in which smaller heterogeneous dies are integrated on a single substrate, through which superior functionality and enhanced operating characteristics can be obtained. Designing a robust, high-speed, low-skew, low-jitter, and low-power clock across such chiplet based systems is extremely challenging. The traditional globally asynchronous locally synchronous (GALS) solution has multiple design overhead and verification challenges that have distanced designers from asynchronous solutions in general. However, enabling clock synchronization for a chiplet based systems (across multiple dies) is extremely difficult and remains a key challenge in multi-die systems.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 1A illustrates a ring structure for a rotary traveling wave oscillator (RTWO), in accordance with various embodiments.

FIG. 1B illustrates a rotary oscillator array (ROA) including a plurality of ring structures coupled to one another, in accordance with various embodiments.

FIG. 2A illustrates a multi-die system including a plurality of dies (e.g., chiplets) coupled to a base die, wherein the base die includes resonant rings of a ROA, in accordance with various embodiments.

FIG. 2B illustrates a first example implementation that includes an active base die, wherein the inverters are implemented in the base die, in accordance with various embodiments.

FIG. 2C illustrates a second example implementation that includes a passive base die, wherein the inverters are implemented in the chiplets and coupled to the rotary rings (e.g., via micro-bumps), in accordance with various embodiments.

DETAILED DESCRIPTION

Figures 3A, 3B, 3C, 3D:
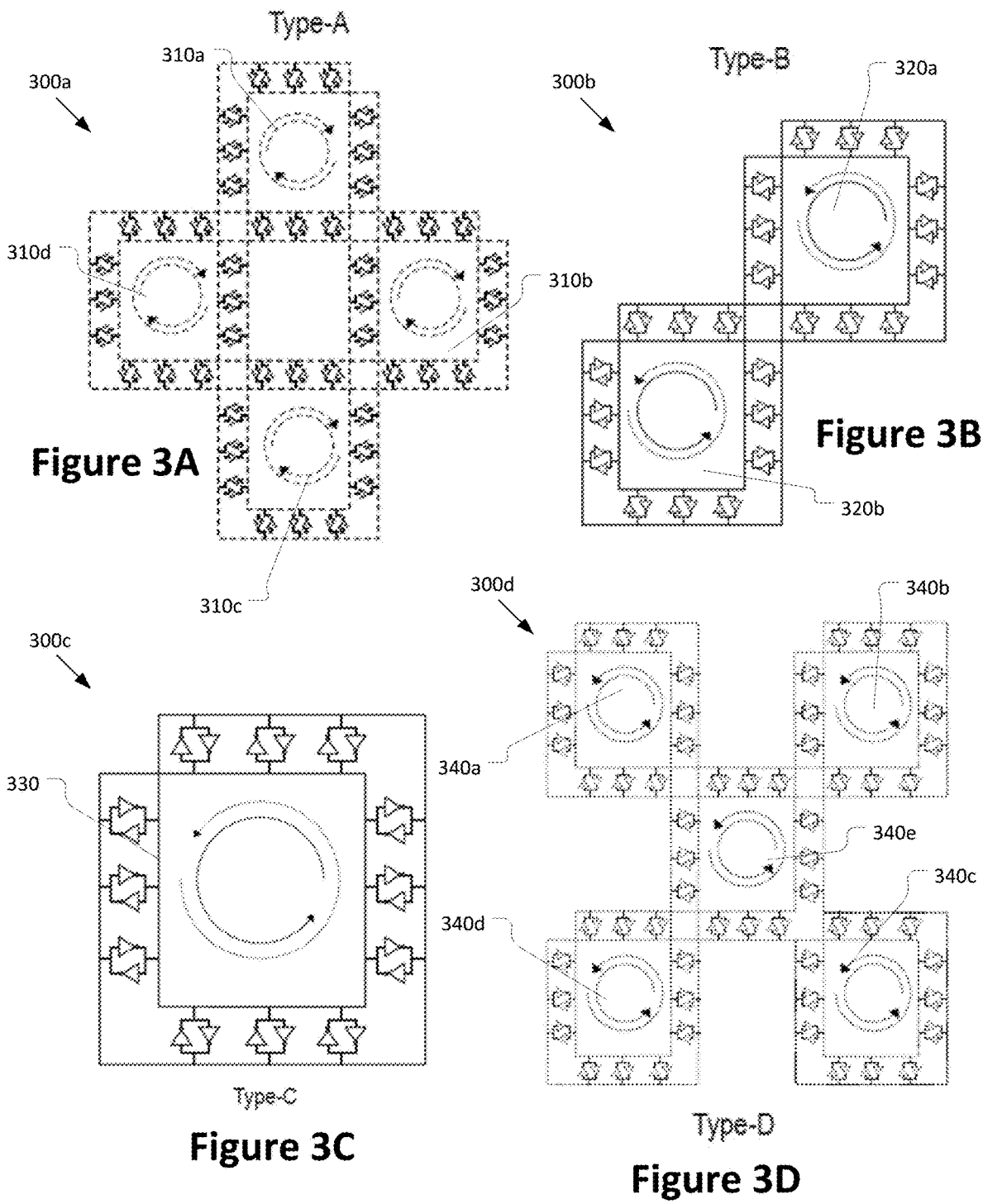
FIGS. 3A, 3B, 3C, and 3D schematically illustrate example unit structures for the ROA circuitry, in accordance with various embodiments.

Various embodiments herein provide apparatuses, systems, and methods for resonant rotary clocking to generate synchronized clock signals. In some embodiments, the synchronized clock signals may be use by a multi-die system.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The terms "substantially," "close," "approximately," "near," and "about," generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), a combinational logic circuit, and/or other suitable hardware components that provide the described functionality. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

Rotary traveling wave oscillators (RTWO) may include a ring structure on which the clock signal travels as a traveling wave. Multiple RTWOs may be coupled to one another in a rotary oscillator array (ROA) to distribute the clock signal over a larger area. For example, FIG. 1A illustrates a RTWO including rotary rings 102a and 102b. The rotary rings 102a-b may be cross-coupled to one another, such that the clock signal may travel continuously along both rotary rings 102a-b. The clock signal may be tapped at different tap points on the ring structure to provide different phases of the clock signal as shown (e.g., 0°, 45°, 90°, etc.). The rotary rings 102a-b may be implemented using interconnects (ICs) and/or other suitable conductive structures for the transmission lines. The RTWO 100 may further include one or more pairs of inverters 104a-b coupled between the rotary rings 102a-b in anti-parallel fashion to power and amplify the signals adiabatically. In some embodiments, the pairs of inverters 104a-b may be complementary metal-oxide-semiconductor (CMOS) inverters, although other types of inverters/transistors may also be used. Additionally, or alternatively, the pairs of inverters 104a-b and/or may be distributed uniformly along the transmission lines.

In embodiments, the RTWO may be modeled as an inductor-capacitor (LC) oscillator, where the frequency $f_{osc}$ is estimated by:

$$f_{osc} \approx \frac{v_p}{2l} = \frac{1}{\sqrt{L_T C_T}} \qquad (1)$$

In Equation (1), $v_p$ is the phase velocity and $l$ is the length/perimeter of the ring.

The 2 factor (in the denominator) arises from fact that the pulse requires two complete laps for a single cycle. Further, the total inductance and total capacitance of a rotary ring are defined by $L_T$ and $C_T$, respectively. The total inductance $L_T$ depends on the geometry of the rotary ring and $C_T$ is the total capacitance of the ring, interconnects and devices connected to the rotary ring.

FIG. 1B illustrates an example ROA 150 that includes a plurality of RTWOs 100 coupled to one another. The RTWOs may be shorted to one another at shorting locations 152a-b. For example, the corner of the outer ring of a first RTWO (e.g., Ring 2 in FIG. 1B) may be shorted to the corner of the inner ring of a second RTWO (e.g., Ring 3 in FIG. 1B) at shorting location 152a, and the corresponding corner of the inner ring of the first RTWO may be shorted to the corresponding corner of the outer ring of the second RTWO at shorting location 152b. Other configurations are also contemplated herein in accordance with various embodiments, for example as shown and described with respect to FIG. 3. The shorting may enable the ROA 150 to provide a clock signal at synchronized tap points across the ROA 150.

Various embodiments herein include the use ROAs to provide clock synchronization across a multi-die system (MDS). The MDS may include, for example, a System-In- Package (SiP). The MDS may include multiple dies coupled to a common base die (e.g., interposer) and/or otherwise integrated into a same package. The dies may include heterogenous dies of different types and/or capabilities. Additionally, or alternatively, the dies may include multiple similar/same dies. For example, the dies may include one or more processor dies, memory dies, graphics processor dies, input-output (IO) dies, power management dies, and/or other suitable types of die.

Aspects of various embodiments herein may include, but are not limited to:

- A ROA circuit including a passive interposer, wherein inverter pairs are implemented on a separate circuit die and coupled to interconnects on the interposer via micro-bumps (μ-bumps).
- A ROA circuit including an active interposer, wherein the inverters and interconnects are both implemented in the active interposer.
- Different options for array structures of the ROAs that may be coupled to one another to provide synchronized clock signals across the multi-die system. Multiple same phase points from these structures may be used to tap the clocks for synchronization across the whole reticle.
- Schemes for synchronization across multiple dies laterally and/or vertically.
- Sequential triggering of the rings on the ROA based on phase and/or frequency detection, e.g., to systematically scale the ROA for clock synchronization.
- Frequency tuning with programmable capacitors coupled to the rings of the RTWOs.
- One or more locking indicators (e.g., phase and/or frequency locking indicators) to provide a ready signal for clock consumption.
- Configurations of the ROAs that provide frequency scaling of the clock signals. For example, ROAs with different topologies may be coupled together. The different topologies may provide clock signals with different frequencies, while being synchronized with one another. Additionally, or alternatively, one or more frequency scaling circuits (e.g., doubler circuits and/or another suitable frequency scaler) may be coupled between rings of different RTWOs to provide frequency scaling.
- A power gating scheme to enable selected regions of the ROA or the entire ROA to be turned on and off
- A multi-mode oscillator circuit that is switchable between a traveling wave mode and a standing wave mode.
- Hybrid oscillator circuitry that may select between resonant clocking and non-resonant (e.g., conventional) clocking. The resonant clocking may include rotary traveling wave and/or standing wave oscillators. The non-resonant clocking may include any suitable clock sources, such as phase-locked loops (PLLs), external clock, real-time clock, etc. In some embodiments, the resonant clocking may be used for global clocking (e.g., that requires synchronization between dies) and the non-resonant clocking may be used for local clocking. Additionally, or alternatively, clock selection circuitry may select from among the available resonant and/or non-resonant clock signals according to one or more operating modes.

These and other aspects of various embodiments are described further below.

Implementation Using Passive or Active Interposer

In various embodiments, the resonant clocking circuit may be implemented in a multi-die system using a passive or active interposer (also referred to as a base die). FIG. 2A illustrates an example multi-die system 200 that includes a plurality of dies (e.g., chiplets) 202 coupled to a base die 204 (e.g., via μ-bumps 206 and/or another suitable mechanism). The base die 204 may include resonant rings 208 formed therein, e.g., in one or more metal layers. The clock signals on the resonant rings 208 may be tapped (e.g., from respective tap points) and provided to the dies 202 through the μ-bumps, e.g., as reference signals for synchronization. Due to the nature of ROAs, multiple tap points exist on the resonant ring structure which we may be used for synchronization, as further discussed herein.

In some embodiments, the multi-die system 200 may include an active base die 204. For example, FIG. 2B illustrates an active base die 204 that includes inverter pairs 210 implemented in the base die 204 and coupled between the inner and outer rings of the resonant rings 208. FIG. 2C illustrates an example of a passive base die 204, in which the inverter pairs 210 are implemented in another die 212. The inverter pairs 210 may be coupled to the resonant rings 208 via μ-bumps and/or another suitable mechanism. In some embodiments, the die 212 may correspond to the dies 202 of the multi-die system 200 (e.g., each die 202 may include inverter pairs that are coupled to respective resonant rings 208 of the base die 204).

The resonant rings in the base die 204 may enable the dies 202 to tap synchronized clock signals with deterministic phase points. In some embodiments, the base die 204 may include bumps 214 coupled to a lower surface of the base die 204, e.g., to mount the multi-die system on a motherboard or another circuit structure. The bumps 214 may be larger (e.g., C4 bumps) than the μ-bumps 206 used to couple the die 202 to the base die 204 in some embodiments.

Silicon interposer-based systems allow for integration of heterogeneous dies capitalizing on the yield and cost benefits. The footprint on the interposer is important because passive interposers demonstrate superior yield with cost reduction through die partitioning, while active interposers demonstrate superior performance while trading-off with cost/yield. Embodiments herein enable the resonant clocking circuit to be used with either a passive or active interposer.

Unit Resonant Rotary Ring Structures for Scaling

The RTWOs may be coupled together to form ROAs in a variety of topologies. Furthermore, multiple ROA unit blocks (e.g., of the same and/or different topologies) may be combined in a suitable arrangement to scale the rotary oscillator circuit across the area of the base die (e.g., across the whole reticle size). The design of these unit structures are critical to make sure that the directionality of the oscillation can be determined and the same phase points across the multiple rings can be identified. FIGS. 3A-3D illustrate four example ROA unit structures that are identified as: Type A, Type B, Type C, and Type D. Other topologies of ROA unit structures may be used in addition to and/or instead of these example ROA unit structures, in accordance with various embodiments herein.

As shown in FIG. 3A, the Type A ROA unit structure 300a includes four RTWO units 310a-d, wherein each RTWO units 310a-d is coupled (e.g., shorted) to two of the other RTWO units 310a-d (e.g., at respective corners), leaving an open space in the middle of the topology (e.g., which may not form a separate traveling wave oscillator ring). The RTWO units 310a-d may be coupled to one another via both a short between an outer ring of a first RTWO unit and an inner ring of a second RTWO unit, and a short between an inner ring of the first RTWO unit and an outer ring of the second RTWO unit. The overall shape of the Type A topology may correspond to a plus sign in some embodiments.

As shown in FIG. 3B, the Type B ROA unit structure 300b includes two RTWO units 320a-b that are coupled (e.g., shorted) to one another (e.g., at a respective corner thereof). For example, the outer ring of RTWO unit 320a may be coupled to the inner ring of RTWO unit 320b at one shorting location and the inner ring of the RTWO unit 320b may be coupled to the outer ring of RTWO unit 320b at one other shorting location.

As shown in FIG. 3C, the Type C ROA unit structure 300c includes one RTWO unit 330 by itself. The RTWO unit 330 may be coupled to other ROA structures (such as ROA structures of Type A, B, C, and/or D), as discussed further below.

As shown in FIG. 3D, the Type D ROA unit structure 300d includes five RTWO units 340a-e. The RTWO units 340a-d may each be coupled to the central RTWO unit 340e (e.g., at respective corners of the RTWO unit 340e). In embodiments, the Type A ROA unit structure 300a may be a brick ring topology, while the Types B-D ROA unit structures 300b-d may be single ring topologies. The single rings of the single ring topologies may be combined to generate a brick structure, e.g., for determination of the oscillation direction.

Figure 4A:
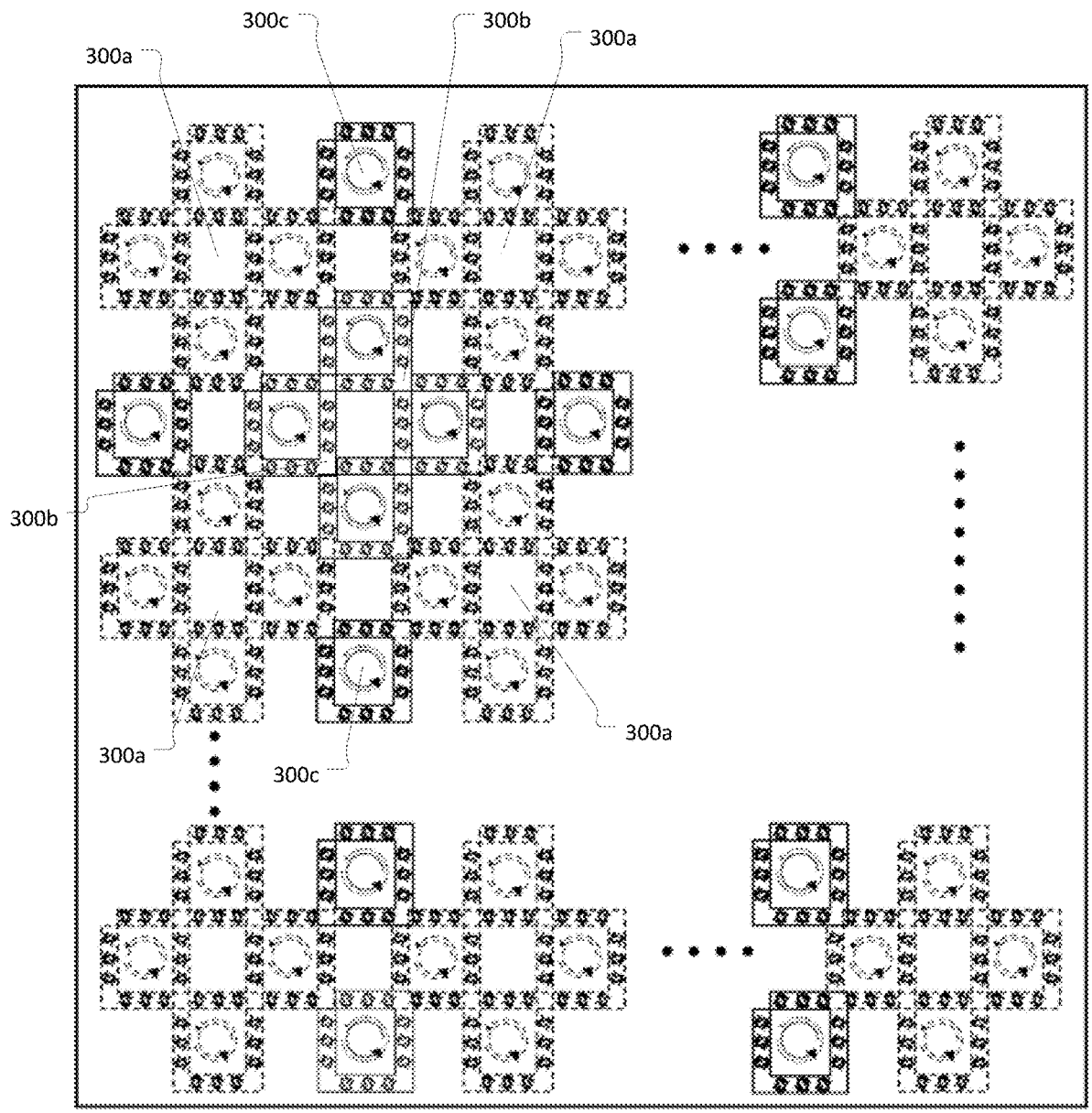
FIGS. 4A and 4B illustrate example topologies to combine the unit structures of FIG. 3 to form an ROA, in accordance with various embodiments.
Figure 4B:
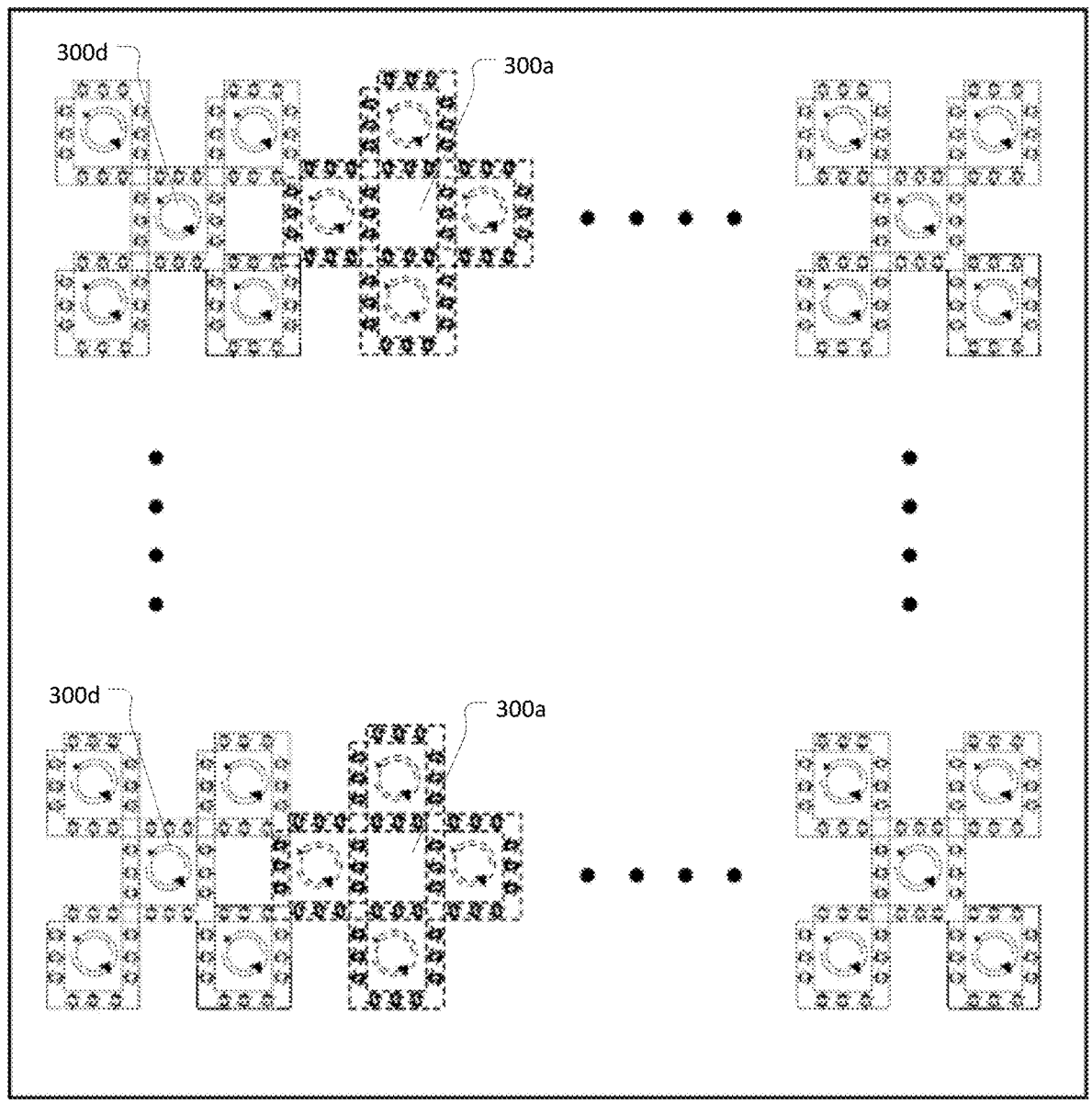

In various embodiments, the ROA unit structures 300a-d may be combined to form the overall ROA circuit across the reticle. The structures 300a-d may be combined in multiple ways to enable lateral scaling. Sample topologies using the ROA unit structures 300a-d are shown as examples in FIGS. 4A and 4B. The ROA circuit may enable clock synchronization across the multi-die system (e.g., the whole reticle). The unit structures 300a-d may make it easier for a circuit designer to provide a ROA circuit across the desired area.

Figure 5A:
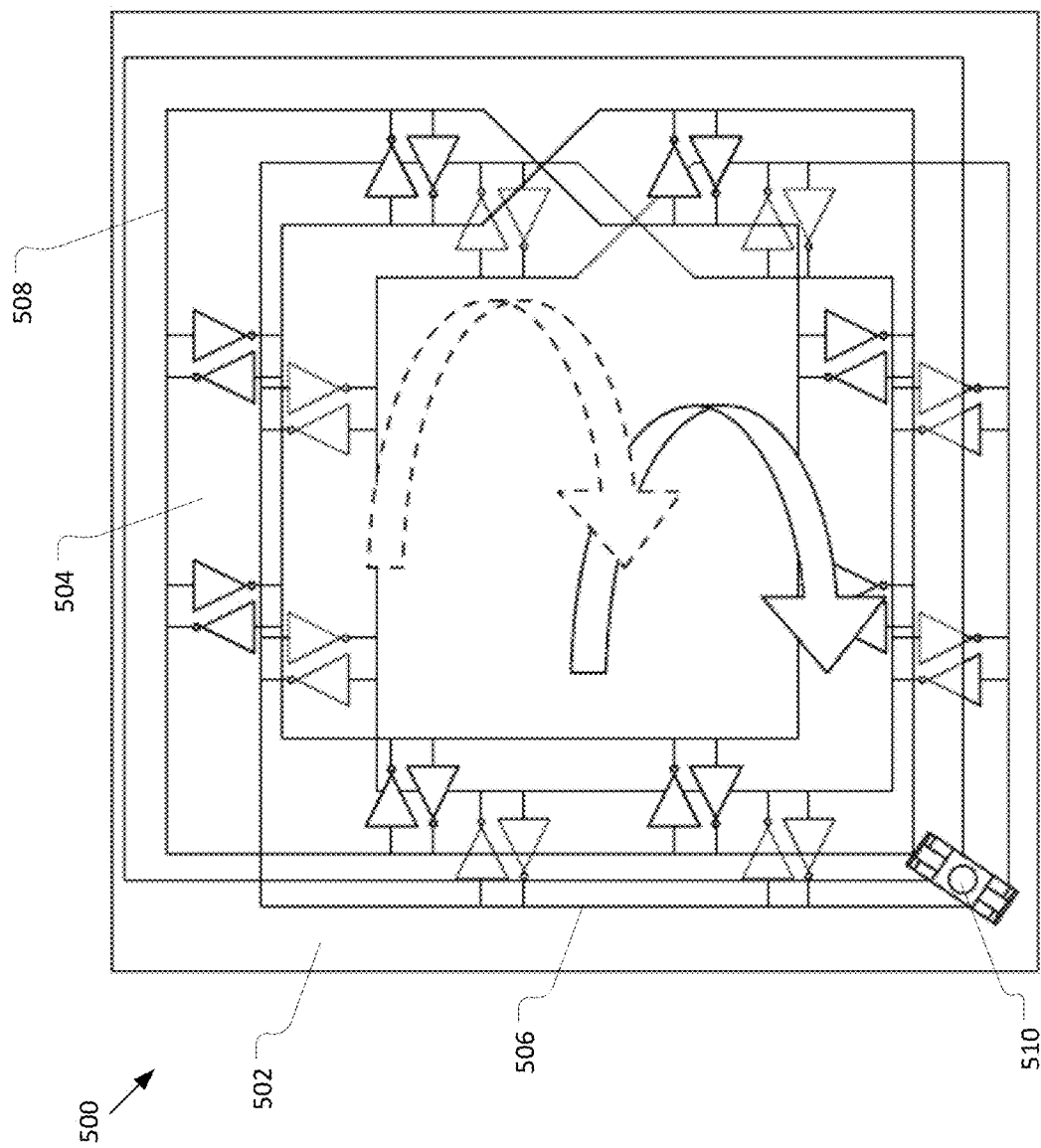
FIGS. 5A and 5B illustrate a top view and front perspective view, respectively, of an example implementation of a vertically scaled ROA structure for clock synchronization across a base die and a chiplet, in accordance with various embodiments.
Figure 5B:
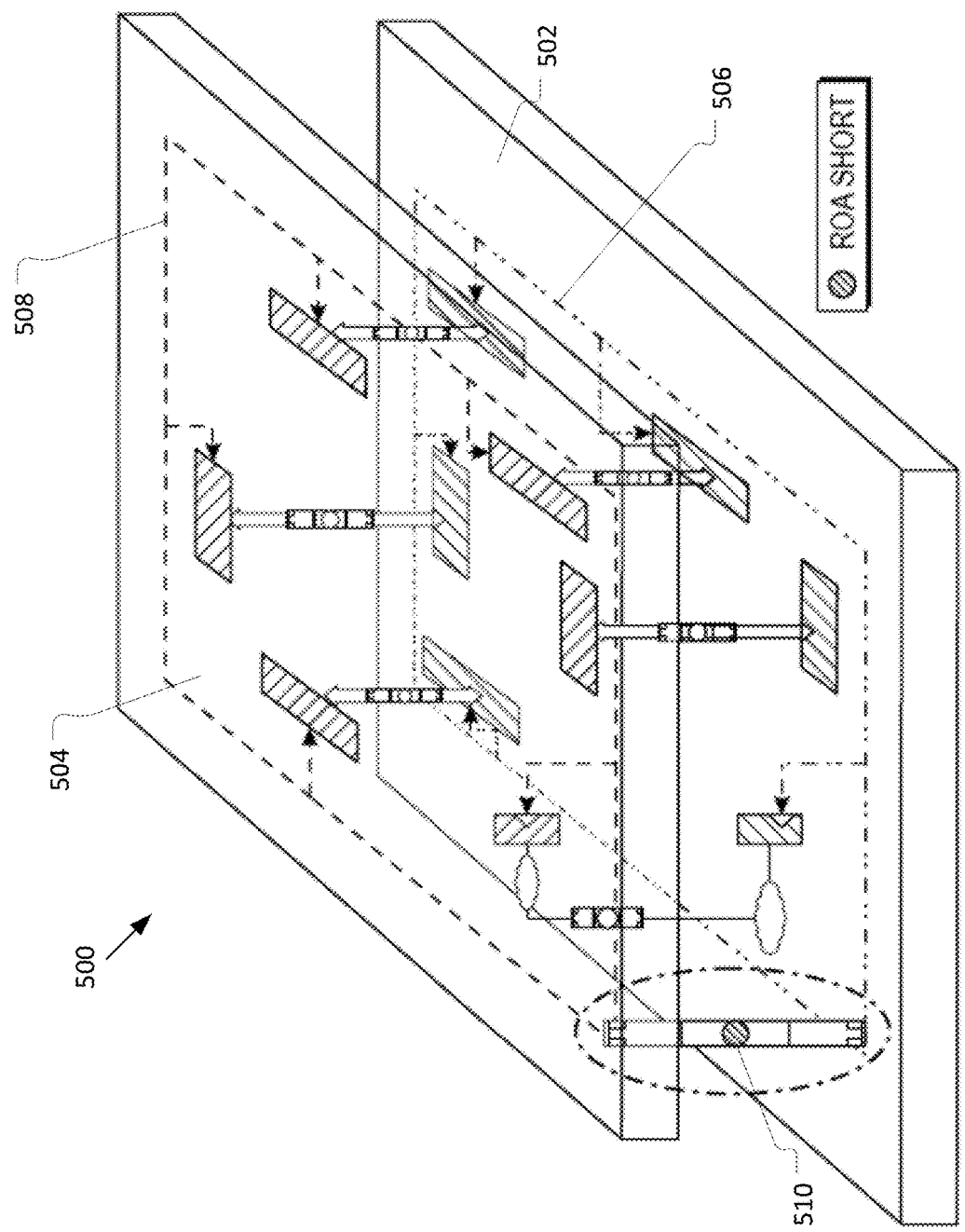

Additionally, or alternatively, the ROA structures may be scaled vertically (e.g., in three dimensions (3D)). For example, the resonant building blocks (e.g., the ROA unit structures 300a-d of FIGS. 3A-3D) may be used to implement same frequency rings on the interposer and chiplet. These form the synchronous ROA by shorting the structures to one another through micro-bumps. The clock signals may tapped from the ROA of base-die and the chiplet die at same phase points enabling synchronization. FIGS. 5A and 5B illustrate a top view and front perspective view, respectively, of an example implementation of a vertically scaled ROA structure 500 for clock synchronization across a base die 502 and a chiplet 504. The base die 502 includes a ROA structure 506, and the chiplet 504 includes a ROA structure 508. The ROA structures 506 and/or 508 may include one or more RTWOs (e.g., cross-coupled resonant rings with inverter pairs coupled between the resonant rings). The resonant rings of the ROA structure 506 may be shorted with the resonant rings of the ROA structure 508 at at least one short location 510.

Accordingly, the vertical scaling may enable synchronization of the clocks from the base die 502 to the chiplet die 504 using resonant rotary clocking implementation—which is otherwise extremely challenging.

Figure 6:
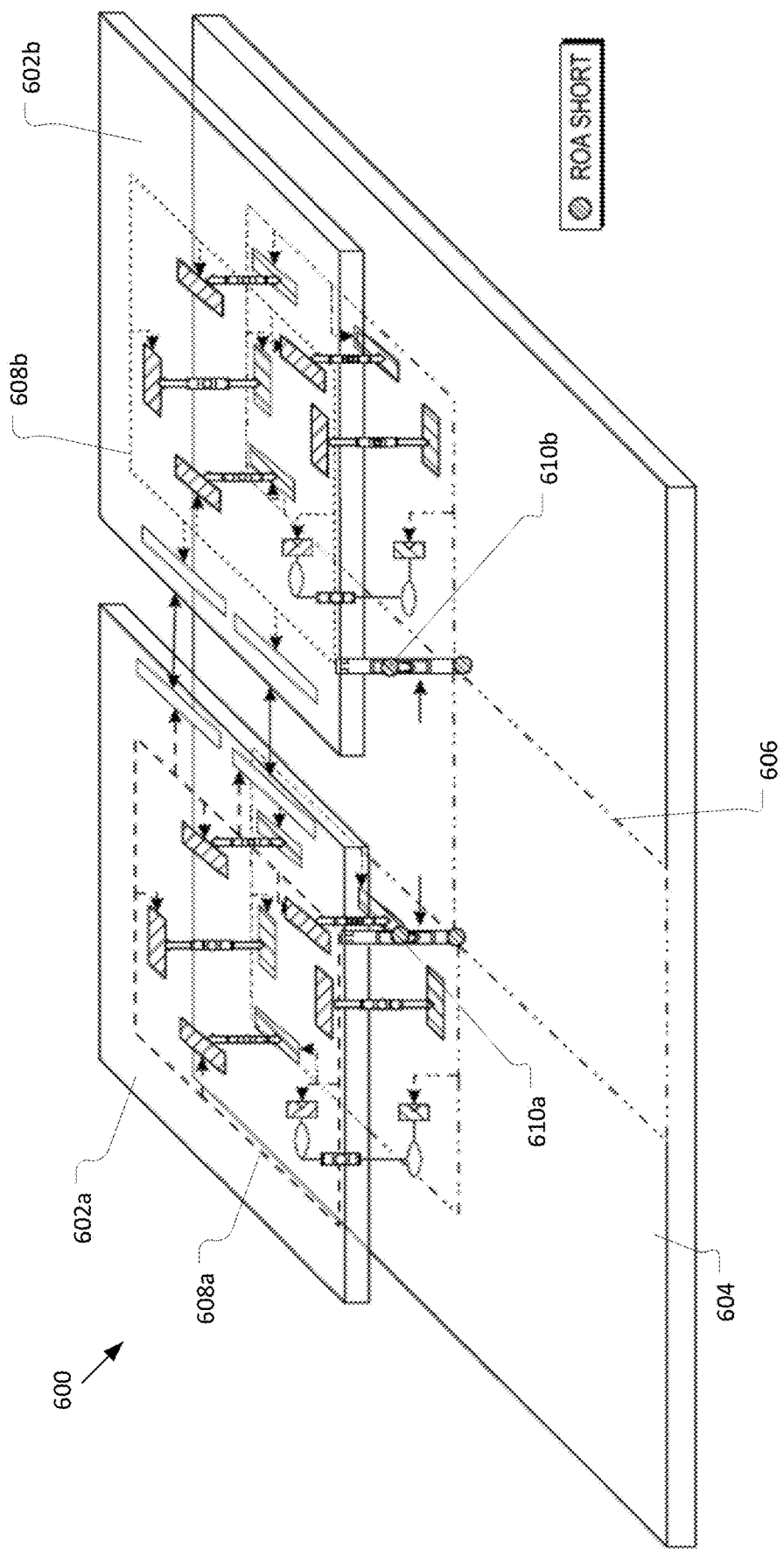
FIG. 6 illustrates an example implementation of a laterally and vertically scaled ROA circuit, in accordance with various embodiments.

In various embodiments, the lateral and vertical scaling schemes may be combined to enable clock synchronization across the multi-die system. FIG. 6 illustrates an example implementation of multi-die system 600 with a laterally and vertically scaled ROA circuit, in accordance with various embodiments. The multi-die system 600 may include a plurality of dies 602a-b coupled to a base die 604. The base die 604 may include a ROA structure 606 and the dies 602a-b may include respective ROA structures 608a-b. The ROA structures 608a-b may be shorted to the ROA structure 606 via shorting lines 610a-b. The ROA structures 606 and 608a-b may provide synchronized clock signals with multiple tap points across the base die 604 and dies 602a-b. In embodiments, the dies 602a-b may use the clock signals for die-to-die communication between the dies 602a-b and/or other purposes.

Accordingly, the schemes described herein may enable clock synchronization across a large area, with multiple tap points and lateral and/or vertical scaling. Additionally, the resonant clocking scheme described herein may provide lower skew and jitter values (e.g., on the order of femtoseconds (fs)) than are provided by conventional clocking schemes.

Example Application of Resonant Clocking Synchronization

Figure 7:
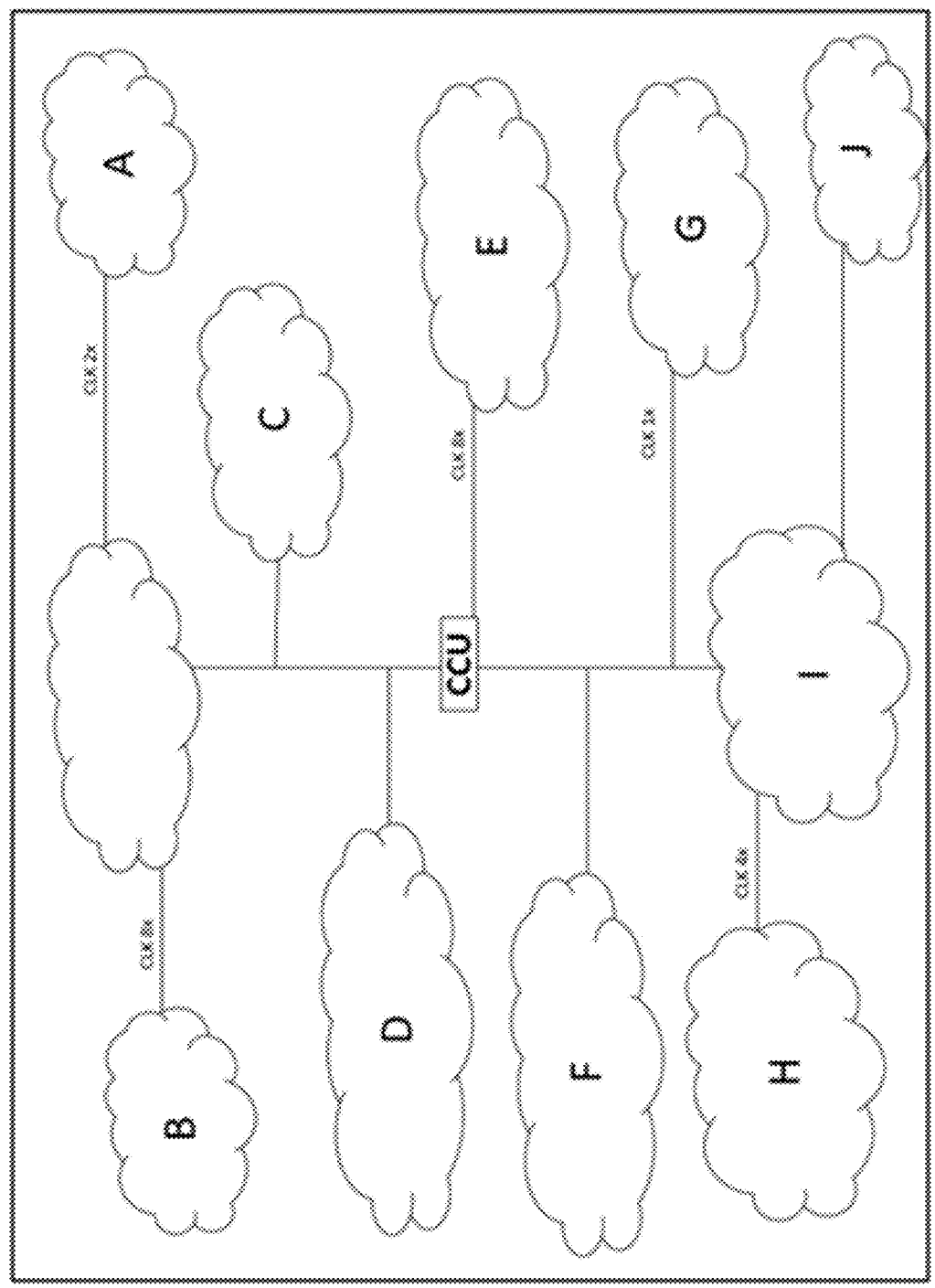
FIG. 7 illustrates an example implementation of a multi-die system with a clock control unit (CCU) and multiple clusters (A-J) having different clock requirements, in accordance with various embodiments.

FIG. 7 illustrates an example implementation of a multi-die system 700 with a clock control unit (CCU) 702 and multiple clusters (A-J) having different clock requirements. The clusters may correspond to different dies and/or different circuit blocks within a die. With traditional schemes, if there is any interaction across clusters (e.g., between A and E or B and G), a synchronizer and additional logic is required. With the resonant rotary clocking implementation on the base die as described herein, it is possible to obtain multiple divided clocks which are phase aligned. The clocks can then be tapped directly from the rings/dividers (e.g., as reference signals) which are phase aligned, thereby mitigating the need to use additional logic or synchronizers.

Phase-Frequency Detection and Tuning for Resonant Rotary Oscillator Array

In state-of-the-art implementations of resonant traveling wave oscillator (RTWO) and rotary oscillatory array (ROA), several issues exist, such as:

Clock settling time: With the ROA scaled to large reticle sizes (hundreds of rings) the initial settling time/phase synchronization takes very long time. Further, in many cases synchronization is difficult/not possible to achieve.

Large overshoots: Large overshoots are observed during settling times due to charge accumulation. This can potentially damage the gates of inverter pairs.

Variations in frequencies: With the ROA scaled to large chiplet/reticle size (hundreds of ring), the oscillating frequency of each ring might be shifted (after the clocks are stabilized) by ±Δf due to various reasons/effects (such as, variation). It is critical to make sure that each ring in the ROA is locked at target frequency 'f'.

Various embodiments herein provide techniques for phase-frequency detection, sequential triggering of oscillator rings/arrays based on frequency and/or phase detection, frequency tuning, and/or generation of a ready indicator for clock consumption. For example, sequential triggering of the ROAs may be performed based on frequency and/or phase detection to systematically scale the ROAs for clock synchronization. Additionally, or alternatively, programmable capacitors may be coupled to the ring structures of the ROAs to provide frequency tuning of the clock signal. Furthermore, enable circuitry may generate a "ready" signal when the clock signal is ready for clock consumption, e.g., based on the phase and/or frequency lock indicators.

Embodiments may address the problems identified above and/or provide other benefits. For example, the embodiments may mitigate large overshoots observed during the settling time of resonant oscillators in a large ROA. Additionally, embodiments may reduce the overall phase synchronization time. Furthermore, the frequency tuning scheme may enable each ring to oscillate at the target frequency. The embodiments may be implemented using a passive or active interposer, as described above.

Phase Detection-Based Sequential Triggering of RTWOs and ROAs

Figure 8:
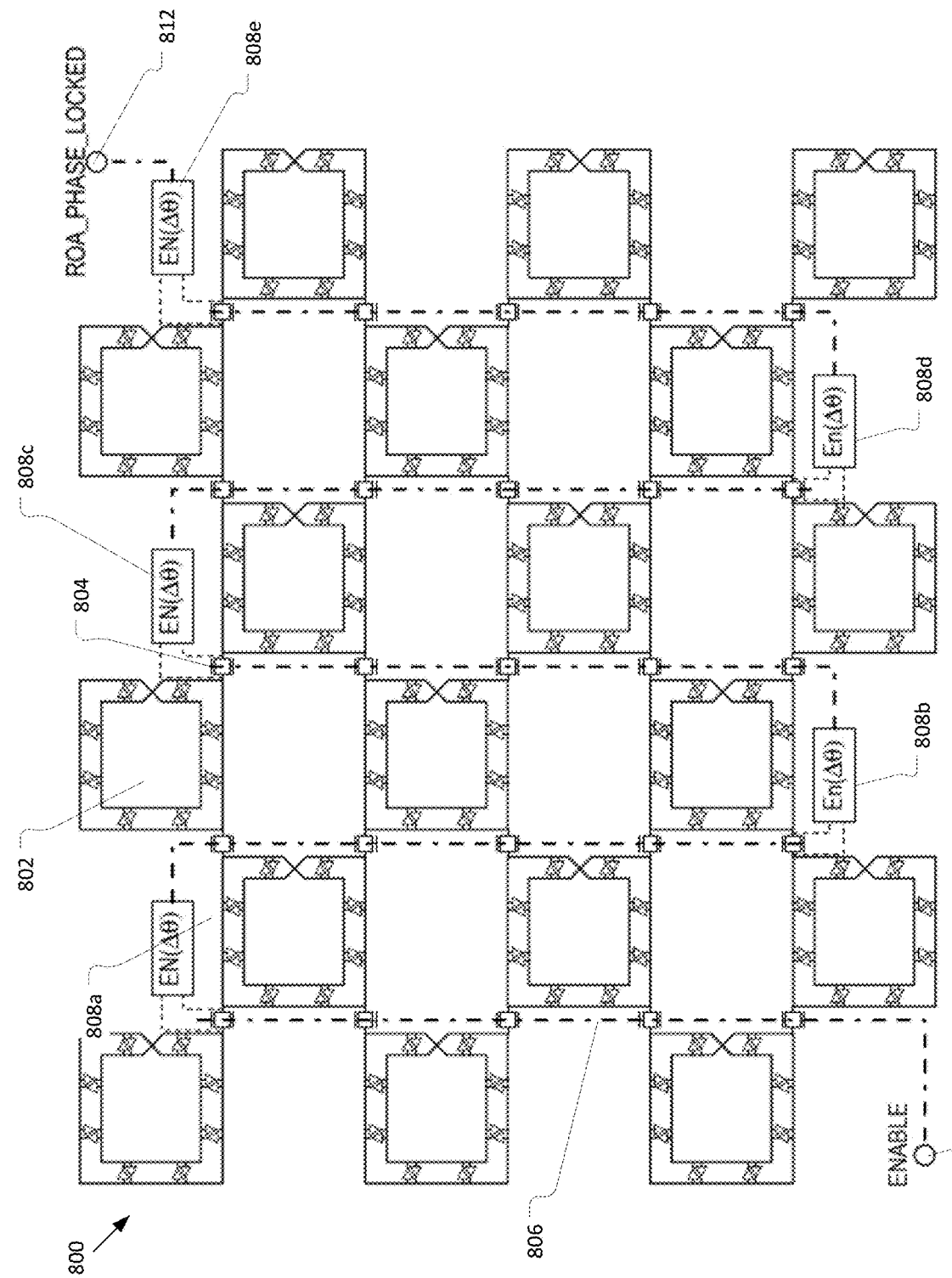
FIG. 8 illustrates an example daisy-chain based scheme to systematically scale oscillator arrays using enable signals, in accordance with various embodiments.

Various embodiments may provide a scheme to systematically scale activation of the rotary oscillator arrays using enable signals [En(Δθ)]. The enable signals may be employed using different topologies, such as daisy chaining and/or a hierarchical scheme to scale the arrays. For example, FIG. 8 illustrates a rotary oscillator array 800 ("ROA 800") that includes an example daisy-chain based scheme in accordance with various embodiments. The ROA 800 includes a plurality of RTWOs 802. As shown, pass gates 804 may be coupled between the rings of respective RTWOs 802 at the phase synchronous points (e.g., the shorting locations discussed elsewhere herein). FIG. 8 illustrates the pass gates 804 coupled between outer rings of the RTWOs. However, in some embodiments, the RTWOs 802 may be coupled to one another with the outer ring of a first RTWO coupled to the inner ring of a second RTWO via a first transmission gate and the inner ring of the first RTWO coupled to the outer ring of the second RTWO via a second transmission gate (e.g., as corresponding to the configurations discussed above with respect to FIGS. 1B and 3A-3D).

In embodiments, the pass gates 804 may be controlled by an enable signal on an enable line 806. The ROA 800 may further include enable circuits 808a-e coupled along the enable line, e.g. in a daisy-chain configuration. For example, as shown in FIG. 8, the enable circuits 808a-e may be coupled at the end of respective columns of pass gates 804. However, it will be apparent that other configurations of the pass gates 804 and/or enable circuits 808a-e may be used. For example, in some embodiments, subsets of multiple RTWOs 802 may be shorted to one another without pass gates between them, and pass gates may be coupled between different subsets.

In operation, an enable signal may be asserted at enable input terminal 810. The enable signal may turn on a first subset of pass gates 804 to couple some of the RTWOs 802 to one another (e.g., the first two columns of RTWOs 802 in FIG. 8). The enable circuit 808a may determine that the clock signals generated by the activated RTWOs 802 have locked. For example, the enable circuit 808a may detect a phase difference among the activated RTWOs 802, and may determine that the clock signals have locked based on the phase difference (e.g., when the phase difference is below a lock threshold). In some embodiments, the enable circuits 808a-d may determine that the clock signals have locked based on one or more other parameters in addition to or instead of phase, such as frequency (e.g., as described further below).

In response to the determination that the clock signals have locked, the enable circuit 808a may pass the asserted enable signal on to the next set of pass gates 804 and/or enable circuit 808b on the enable line 806. The activation process may proceed in a sequential manner to the last enable circuit 808e on the enable line 806. When that enable circuit 808e determines that the clock signals have locked, it outputs a lock indication signal (e.g., roa_phase_locked) at an enable output terminal 812.

In some embodiments, the pass gates 804 may be sized for impedance matching (e.g., with the transmission line interconnects that form the rings of the RTWOs). Note that, there could be overshoots as a result of surge current observed if the multiple rings oscillate together to get to a stable state. By incorporating sequential triggering, the large overshoots during clock settling may be mitigated. The overall scheme provides the 'roa_phase_locked' signal indicating phase-lock state of resonant oscillations on the scaled ROA.

ROA Frequency Tuning and Frequency Locking

Figure 9:
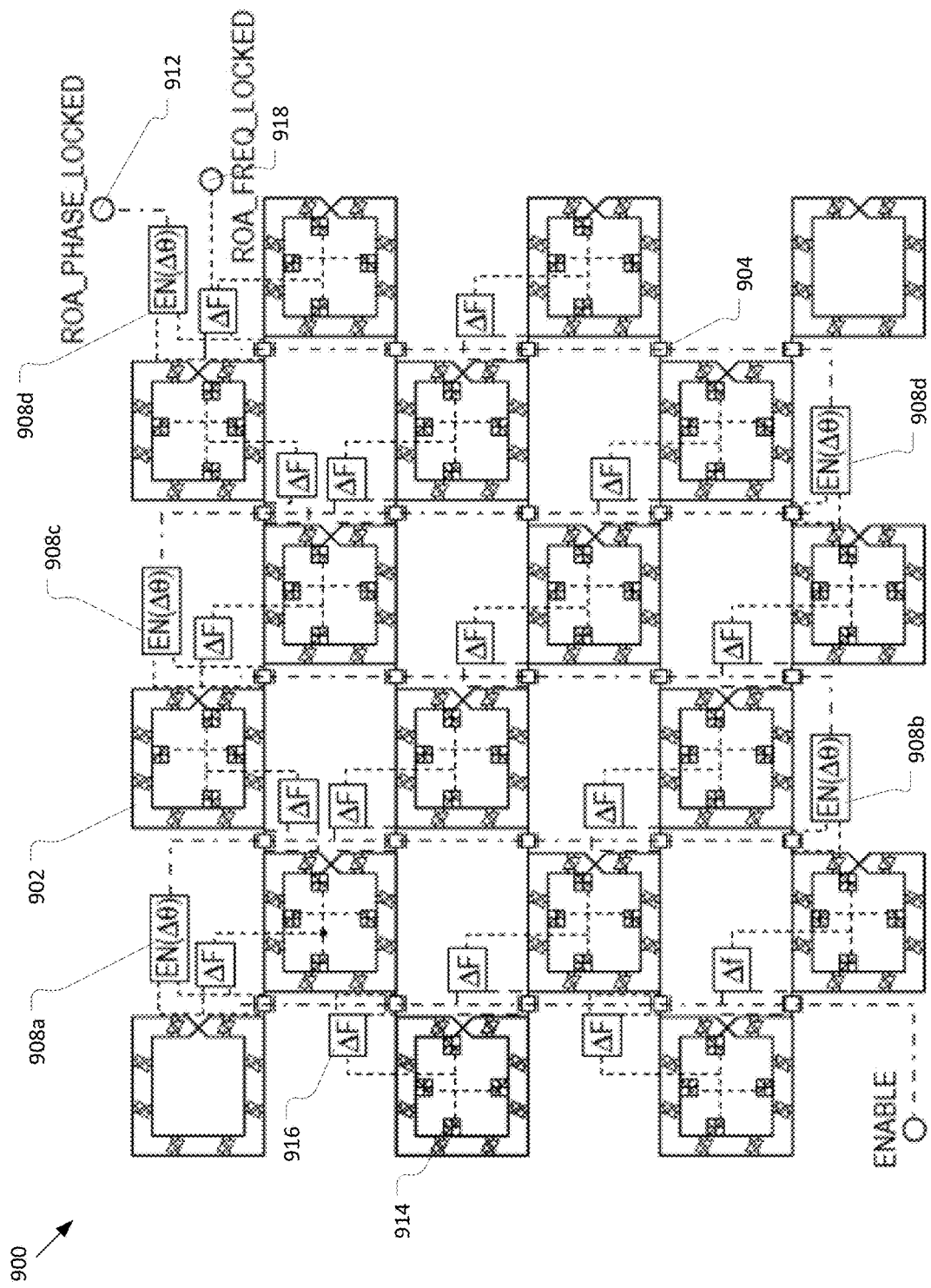
FIG. 9 illustrates a ROA with circuitry to provide frequency tuning and locking, in accordance with various embodiments.

As discussed above, embodiments may further include techniques for frequency tuning and/or frequency locking in the rings of the ROA. FIG. 9 illustrates a ROA 900 with circuitry to provide frequency tuning and locking, in accordance with various embodiments. For example, the ROA 900 may include RTWOs 902, pass gates 904, and enable circuits 908a-e similar to corresponding components of the ROA 800. The ROA 900 may further include tuning capacitors 914 (e.g., programmable tuning capacitors) coupled to the rings of the RTWOs 902, and frequency tuning circuits 916 coupled to the tuning capacitors 914. In some embodiments, the ROA 900 may include a frequency tuning circuit 916 coupled to each RTWO 902 to detect the frequency difference between that RTWO 902 and a target frequency. The frequency tuning circuits 916 may tune each RTWO 902, using the tuning capacitors 914, based on the detected frequency difference.

In some embodiments, the frequency tuning circuits 916 may also be selectively activated in a sequential manner, e.g., by the enable signal that is also used for the sequential phase locking procedure. Accordingly, the scheme of the ROA 900 in FIG. 9 may be used to sequentially tune each ring and systematically trigger the next ring in ROA 900 to match the frequency. Alternatively, the frequency tuning circuits 916 may perform the frequency tuning after all or a group of the rings is turned on. In embodiments, the frequency tuning scheme provides a 'roa_freq_locked' signal (e.g., at output terminal 918) indicating frequency-lock of resonant oscillations on the scaled ROA.

Figure 10:
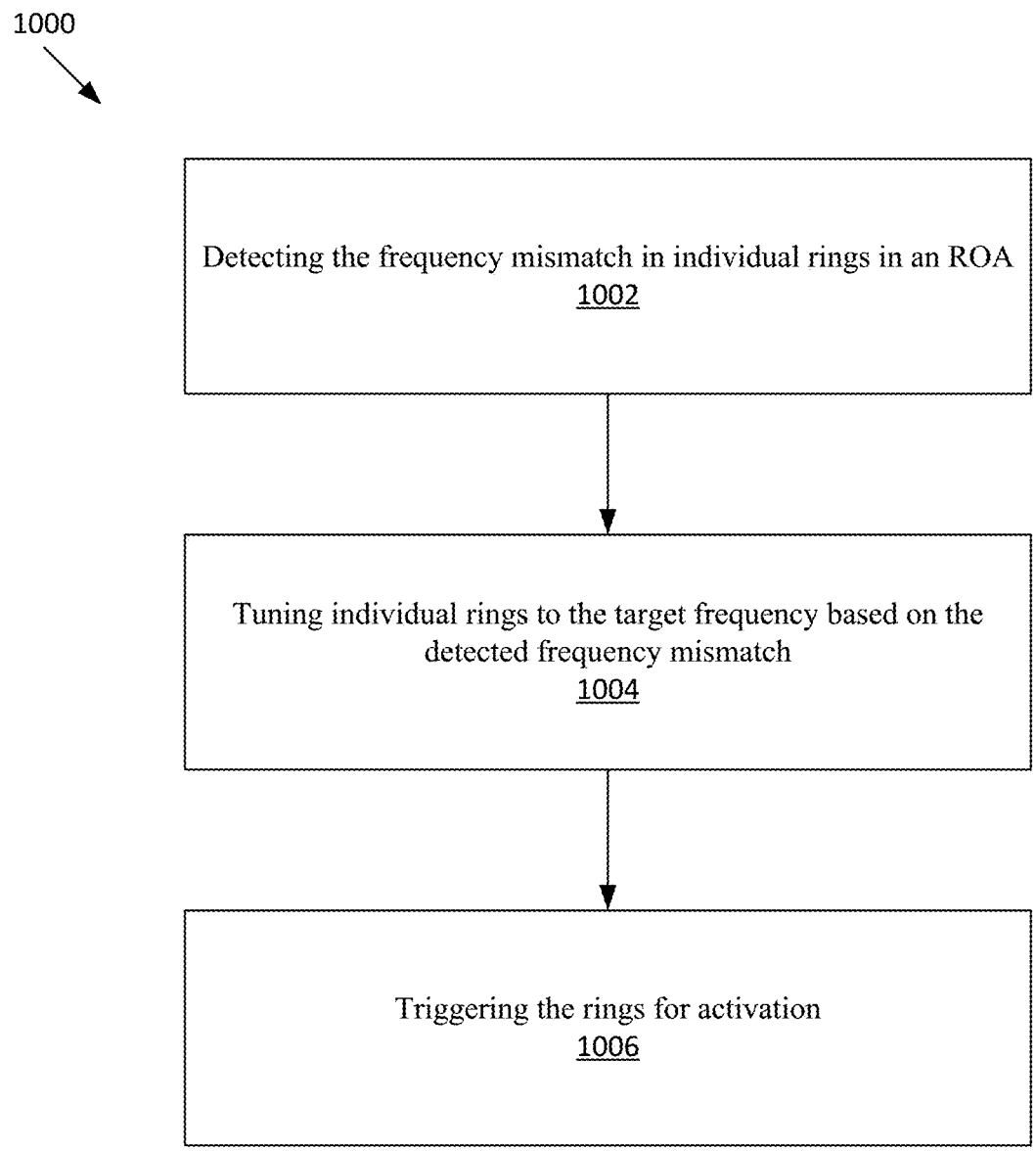
FIG. 10 illustrates an example process for frequency tuning and frequency locking, in accordance with various embodiments.

FIG. 10 illustrates an example process 1000 for frequency tuning and frequency locking, in accordance with various embodiments. In some embodiments, the process 1000 may be performed using the ROA 900 of FIG. 9.

At 1002, the process 1000 may include detecting the frequency mismatch between each ring in an ROA. The mismatch may correspond to a difference between a measured frequency of the ring and a target frequency. Alternatively, or additionally, the frequency mismatch may include a comparison of the frequency of a ring to the frequency of one or more other rings in the ROA.

At 1004, the process 1000 may further include tuning individual rings to the target frequency based on the detected frequency mismatch. For example, the rings may be tuned using programmable tunable capacitors that are coupled to respective rings.

At 1006, the process 1000 may further include triggering the rings for activation. For example, the rings may be triggered using enable signals and pass-gates. In embodiments, the rings may be triggered when the frequency mismatch is below a threshold.

Accordingly, the process 1000 may enable frequency tuning and sequential triggering of rings of the ROAs to scale the ROAs and ensure that individual rings generate the clock signal with the target frequency.

Generation of Ready Signal for Clock Consumption

Figure 11:
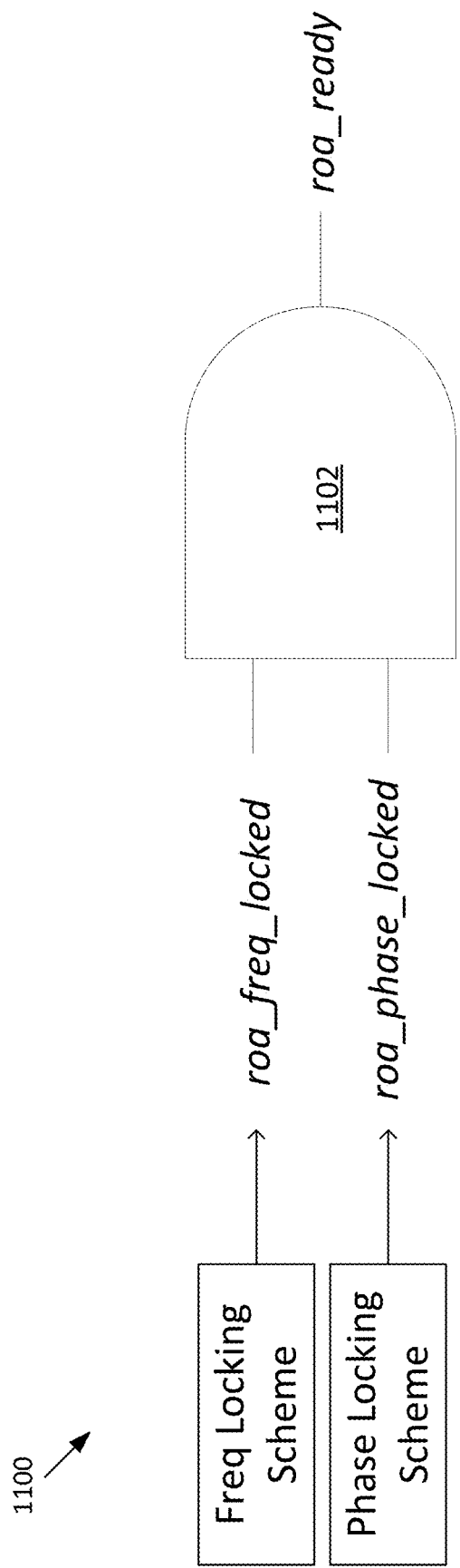
FIG. 11 illustrates example circuitry to provide a ready signal for clock consumption, in accordance with various embodiments.

In embodiments, (frequency tuning/locking and phase locking—e.g., in that order) may be combined to capture any phase/frequency drift during the overall operation. FIG. 11 illustrates an example ready indication circuit 1100. The ready indication circuit 1100 may be used with an ROA circuit, such as the ROA 900 of FIG. 9. As shown, the ready indication circuit 1120 receives the 'roa_freq_locked' and 'roa_phase_locked' signals and generates a 'roa_ready' signal when both the 'roa_freq_locked' and 'roa_phase_l- ocked' signals are asserted (e.g., using an AND gate 1102 as shown). A high/assertion on 'roa_ready' indicates that the clock signals are ready for consumption in the system.

Frequency Scaling

Various embodiments herein further include techniques for frequency scaling in the rotary oscillator circuitry. For example, different ring topologies may be included in the ROA circuit to provide different target frequencies.

In prior rotary oscillators, the size of a rotary ring is computed depending on the target frequency. The rotary ring size in a ROA remains the same throughout the design providing single target frequency. Accordingly, it is not possible to provide additional scaled/divided frequencies in prior implementations without the use of dividers. Furthermore, it is extremely hard to devise high frequency dividers—especially if the clocks are tapped from multiple rings in a very large ROA.

Additionally, existing resonant divider circuitry does not provide divided clocks with 50% duty cycle. There are additional circuits required to correct the duty cycle. It is possible to use non-resonant dividers to divide the resonant clocks. However, it is challenging to devise standard dividers for high-speed clocks. Most existing high frequency dividers are devised using a custom design. This also brings additional scaling challenges. Furthermore, there are no existing solutions which provide frequency scaling with compensation for interconnect and temperature variations, which may be especially important on large ROAs.

Aspects of various embodiments herein include techniques for frequency scaling using rings with different sizes of configurations in ROAs. The different sized rings may be shorted at specific locations to compensate for variation, e.g., interconnect and/or temperature variation. Embodiments also include a frequency doubling scheme using doubler circuits. Furthermore, some embodiments may include a custom-shaped ring topology (e.g., non-square/circular or non-regular-shaped). The custom-shaped ring topology may be combined with regular-shaped (e.g., square and/or circle) rings for frequency scaling.

The embodiments provide several advantages over prior techniques. For example, embodiments enable multiple clock frequencies to be obtained directly from the ROA circuitry, without using frequency dividers. Additionally, or alternatively, the frequency scaling techniques described herein may be scalable to a large die area. Furthermore, the embodiments may provide tolerance to variation in the interconnects and/or temperature by shorting the rings at selected edge locations. These and other advantages will be apparent from the further discussion of various embodiments for frequency scaling below.

Frequency Scaling Using Different Ring Topologies

As discussed above, some embodiments may include use regular ROAs in different interconnect topologies with varying perimeters (e.g., translating to varying granularities of inductance (L) and capacitance (C)). Multiple sample implementations are described herein, and additional implementations are contemplated within the scope of the present disclosure.

Figure 12:
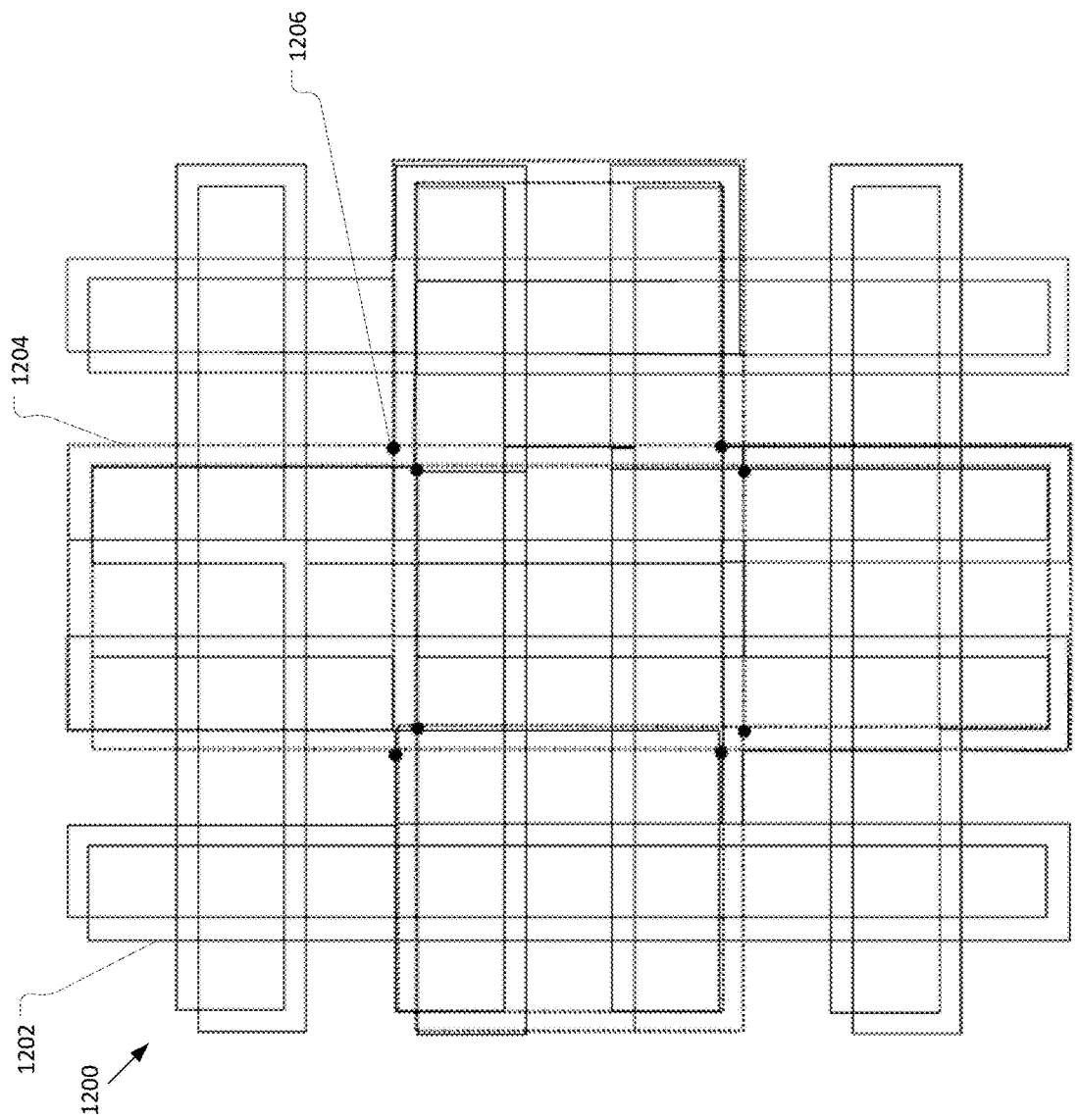
FIG. 12 illustrates an example oscillator circuit with different ring topologies to provide frequency scaling, in accordance with various embodiments.

Implementation 1: FIG. 12 illustrates a sample implementation of a multi-topology circuit 1200 with 2 different ring topologies 1202 and 1204. Note that, in each ring, inverter pairs may be connected between the interconnects (e.g., as shown in FIGS. 1A-1B), which are not shown in FIG. 12 for ease of understanding. The ring topologies 1202 and 1204 may be implemented in different metal layers of the base die. Additionally, the ring topologies 1202 and 1204 are shorted to one another at specific locations 1206, as shown.

Figure 13:
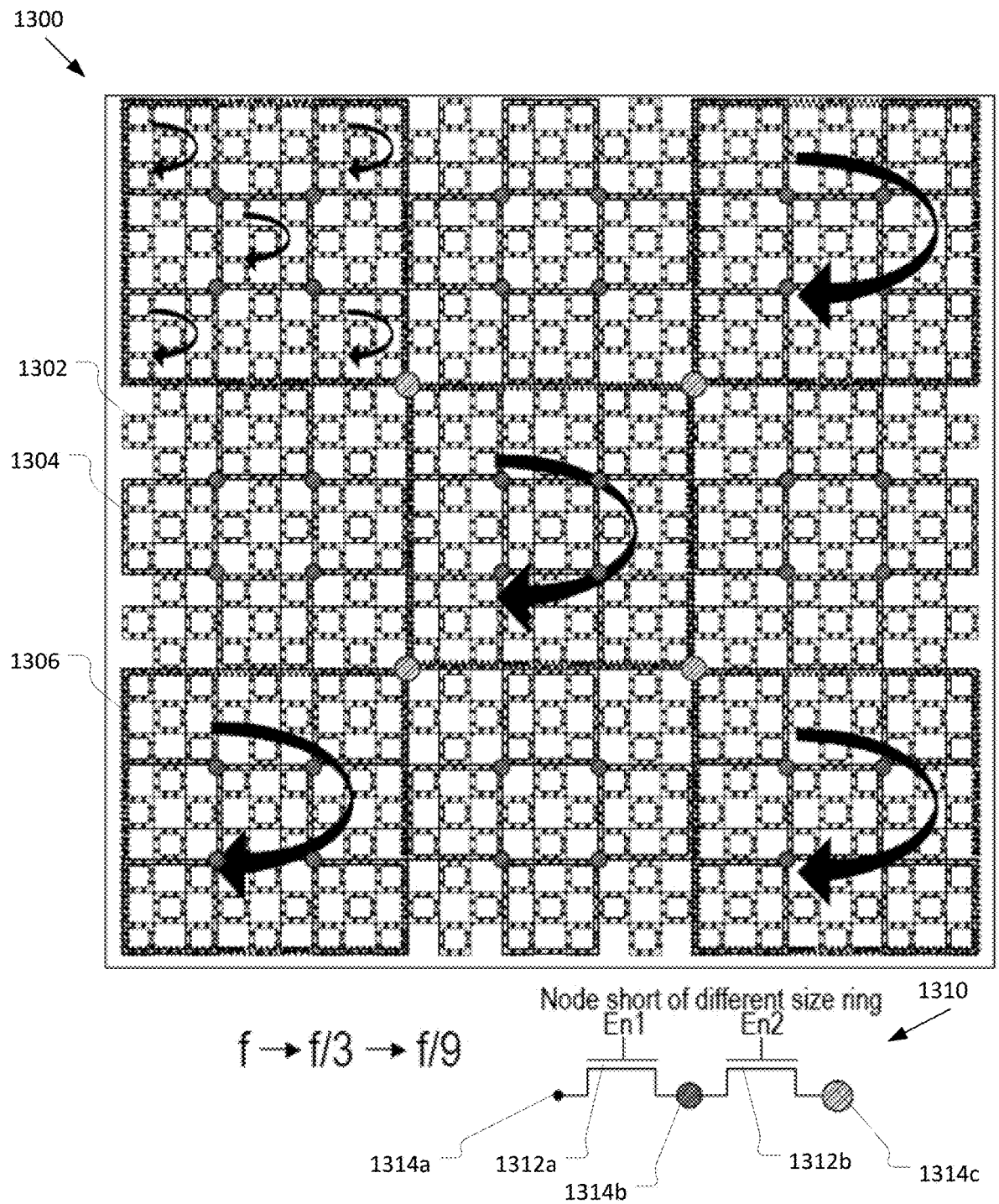
FIG. 13 illustrates another example oscillator circuit with different ring topologies to provide frequency scaling, in accordance with various embodiments.

Implementation 2: FIG. 13 illustrates another example implementation of a multi-topology circuit 1300 that includes 3 different ring topologies 1302, 1304, and 1306 for frequency scaling. In the example of FIG. 13, the topologies 1302, 1304, and 1306 provide target frequencies of ~f, ~f/3, and ~f/9, respectively. It is possible to enable these 3 topologies in a single scheme by shorting different sized arrays. An example shorting circuit 1310 is depicted at the bottom in FIG. 13. For example, the shorting circuit 1310 may include one or more transistors 1312*a-b* coupled between nodes 1314*a-c* of respective rings of different topologies 1302, 1304, and 1306.

The multi-topology circuit 1300 depicted in FIG. 13 and/or another suitable multi-topology circuit 1300 may be scaled to large reticle sizes. Different topologies may be incorporated in addition to or instead of topologies 1302, 1304, and/or 1306 using the shorting mechanism to provide scaled clocks. The multi-topology circuits 1200 and 1300 are presented as examples, and it will be apparent that many variations of circuits using multiple ROA topologies may be used in accordance with various embodiments herein.

Figure 14:
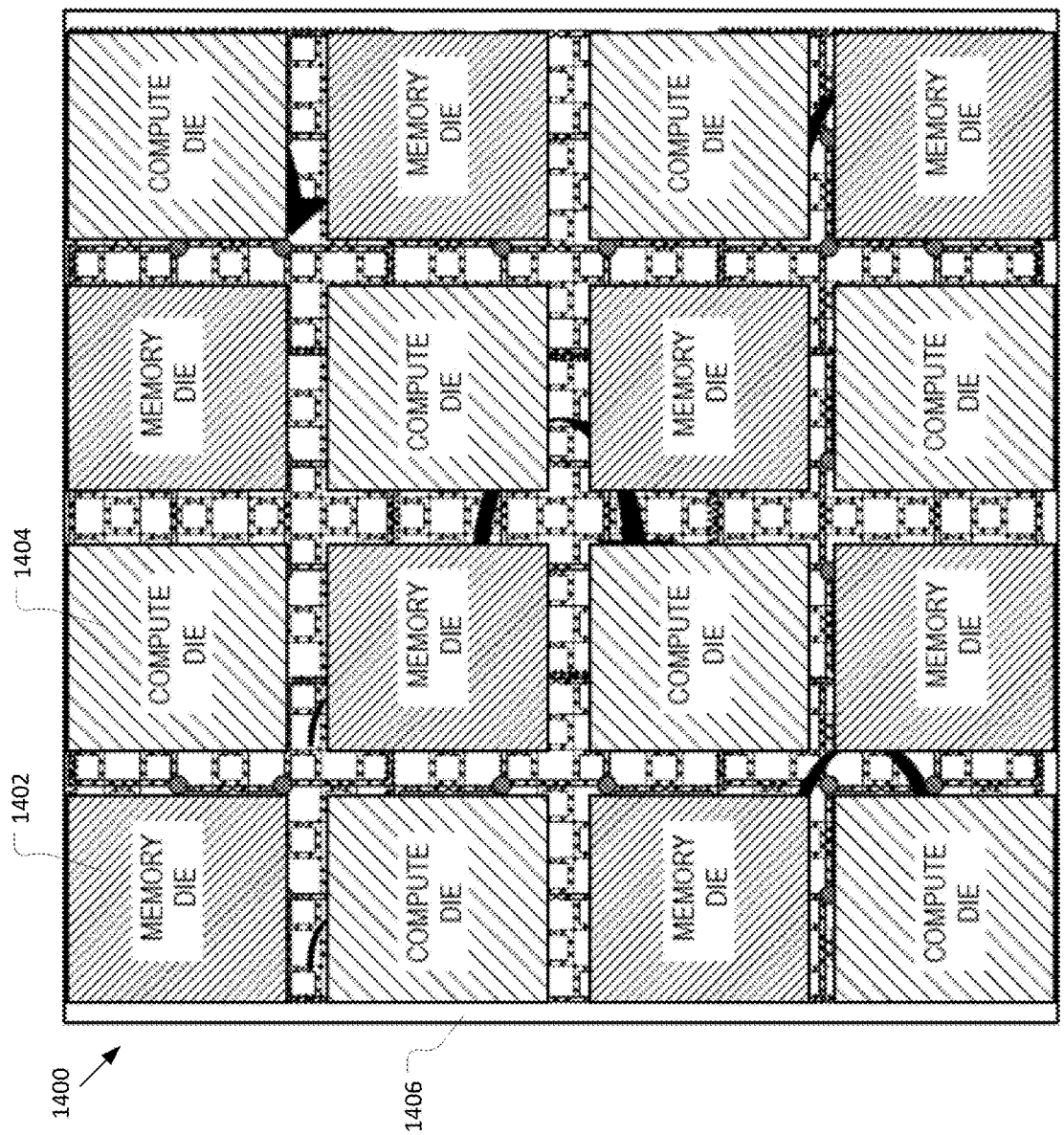
FIG. 14 depicts a multi-die system with multiple memory and compute dies, in accordance with various embodiments.

Additionally, the multi-topology circuit may also aid in variation tolerance. The variation tolerance requirement is motivated by the fact that the different chiplets in a multi-die system can have different temperature gradients. FIG. 14 depicts a multi-die system 1400 with multiple memory dies 1402 and compute dies 1404 coupled to a base die 1406. Depending on the workload, the temperature variation may be observed as a gradient across different dies 1402 and 1404. In embodiments, the base die 1406 may include the multi-topology circuit 1300, as shown, or another suitable multi-topology circuit. With this scheme, different RTWO sizes may compensate for global interconnect and temperature variations.

The different RTWO sizes may be shorted at specific shorting locations/edges to ensure that the oscillations can be sustained and/or that there are no spurious signals. For example, in FIG. 13, topology 1306 should not be shorted to topology 1304 in the middle of the top left ring. Rather, the ring topologies should adhere to the brick structures (e.g., the unit structures 300*a-d* of FIGS. 3A-3D and/or ROA circuits of FIGS. 4A-4B) to ensure that the rings oscillate in sync and the directionality is deterministic.

Figure 15:
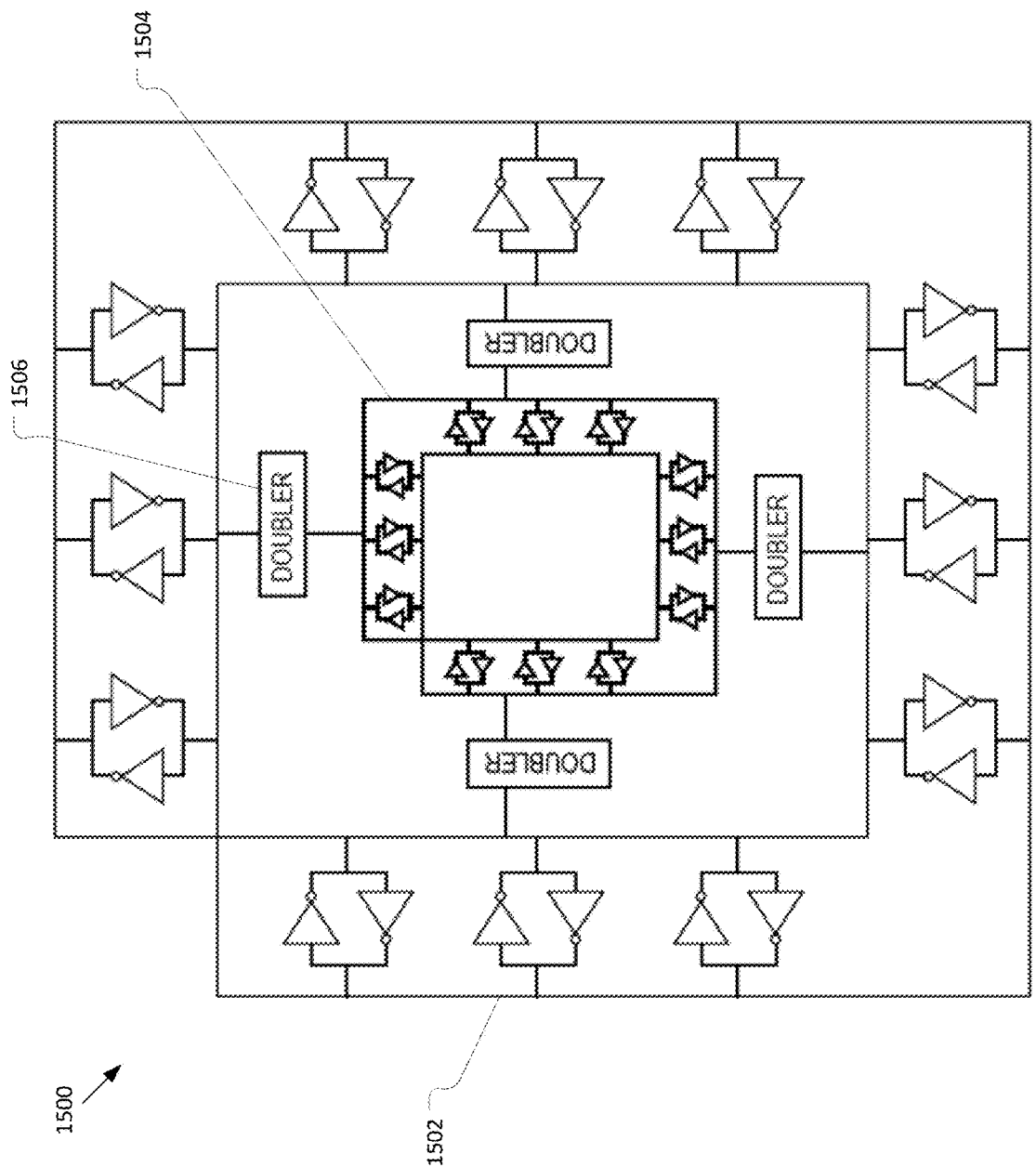
FIG. 15 illustrates an example circuit to implement a frequency doubling scheme, in accordance with various embodiments.

Implementation 3: In another possible implementation, a frequency doubling scheme may be employed (e.g., using regular/square RTWOs). FIG. 15 illustrates an example circuit 1500 to implement the frequency doubling scheme. The circuit 1500 includes an outer RTWO 1502 that may operate at a first frequency (e.g., f1) and an inner RTWO 1504 that may operate at second frequency (e.g., 2f1) that is double the first frequency. The second harmonic of the outer RTWO 1502 may be used to drive the inner RTWO 1504 through one or more doubler circuits 1506 that are coupled between the outer RTWO 1502 and the inner RTWO 1504.

In embodiments, the circuit 1500 may be coupled with other circuits 1500 to form a ROA circuit as described herein.

Frequency Scaling Using Custom ROA Topologies

Figure 16:
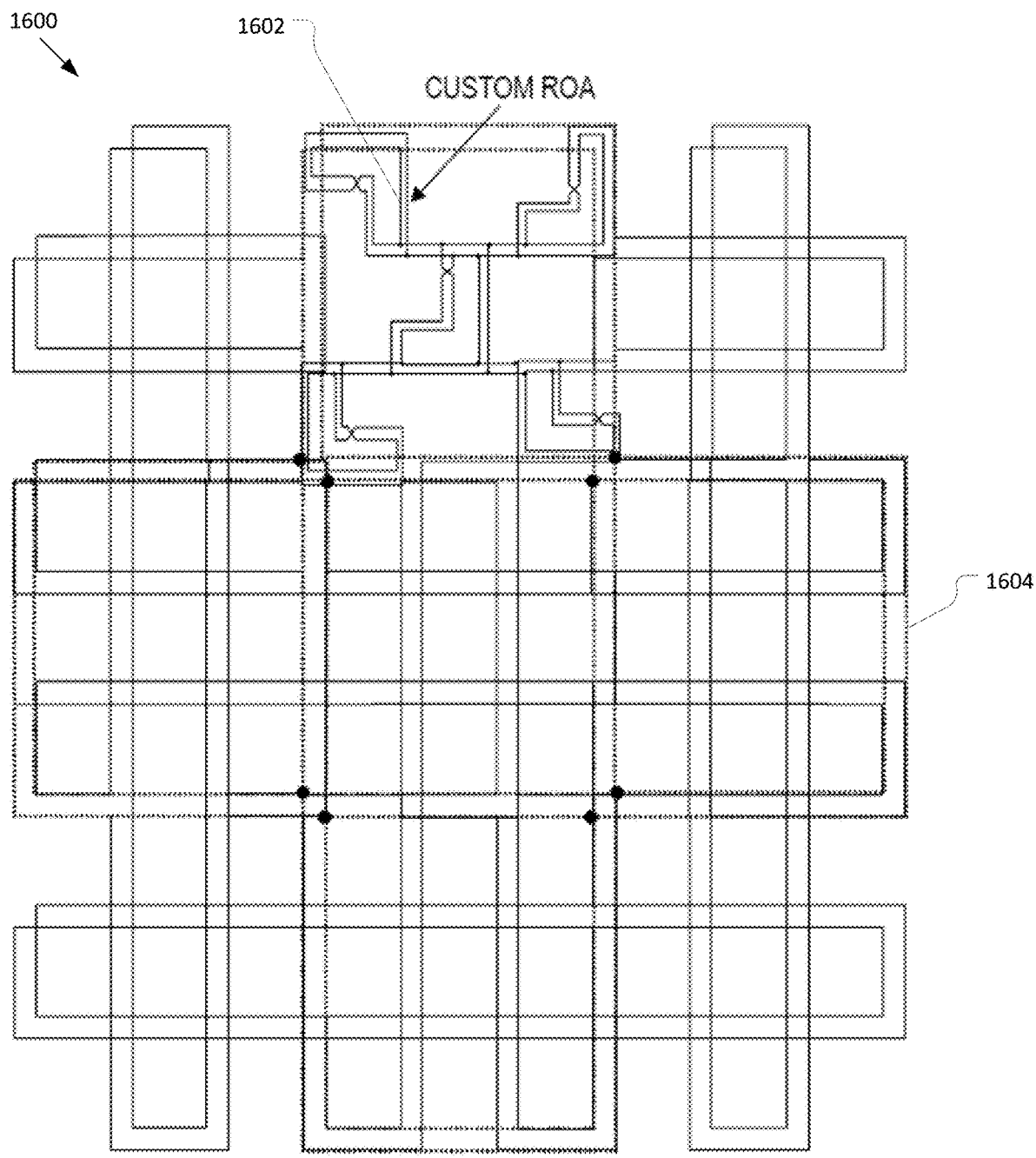
FIG. 16 illustrates a sample implementation of an oscillator circuit including a custom ROA combined with a regular ROA, in accordance with various embodiments.

In some embodiments, one or more custom ROAs in different interconnect topologies with varying perimeters (e.g., translating to varying granularities of inductance (L) and capacitance (C)) may be used for frequency scaling. The custom ROAs may include rings of any suitable shape. For example, in some embodiments, the rings may be non-regular but rectilinear (e.g., with 90 degree turns in the interconnect lines). The one or more custom ROAs may be used throughout or may be combined with one or more regular (e.g., square or circular) ROAs to enable frequency scaling. One of the advantages of using custom ring topology is that the rings need not be fixed at the geographical center but may instead be implemented to cover the area in such a way that the tapping wirelength can be reduced/minimized. FIG. 16 illustrates a sample implementation of a multi-topology circuit 1600 that includes a custom ROA 1602 combined with a regular ROA 1604. The custom ROA 1602 and regular ROA 1604 may be shorted to one another at select locations, and may provide synchronized clock signals with scaled frequencies. In some embodiments, the custom ROA may include one or more regions that have custom/irregular shaped rings, and one or more other regions that have regular shaped rings, as shown in FIG. 16.

Power Gating

Various embodiments herein may enable power gating of oscillator rings (e.g., RTWOs) in the ROAs. For example, power control circuitry may be used to systematically and/or deterministically turn oscillator rings on or off to enable power gating or controlling resonant oscillations. In some embodiments, a multi-modal clock circuitry may be used that enables dynamic switching between RTWOs and other clock signals, such as PLLs, standing wave oscillators, etc. Embodiments related to multi-modal clocking are described further below. The power gating may enable the RTWOs to be powered off (either globally or locally to specific circuits/dies) when other types of clock signals are used. Additionally, or alternatively, the power gating may be used to provide power savings when chiplets or other circuitry are in a turned off or in another low power or low activity mode. For example, certain areas of an ROA (e.g., that provide a clock signal for a corresponding die or circuit block) may be selectively power gated. In some embodiments, one or more ROA topologies of a multi-topology circuit (e.g., multi-topology circuit 1200, 1300, and/or 1600) may be selectively power gated (e.g., based on a determination that the corresponding clock frequency is not needed).

Figure 17:
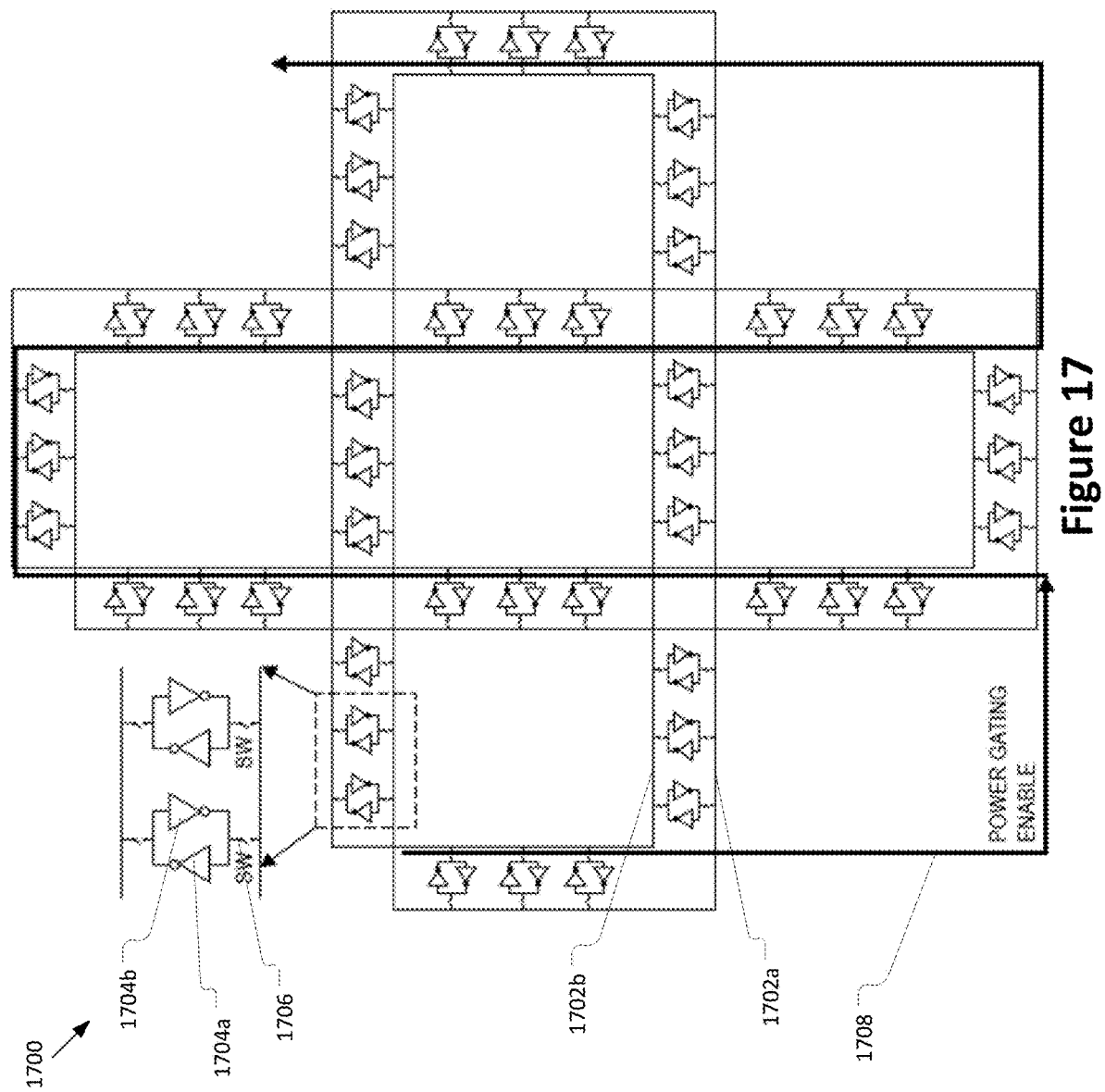
FIG. 17 illustrates an ROA circuit with power gating in accordance with various embodiments.

In embodiments, the resonant clock circuitry may include power gates to control the on/off voltage for the inverter pairs coupled to individual resonant ring structures. The power gating scheme may be extended to the ROA circuit using different topologies. One such implementation of a ROA circuit 1700 with power gating that uses a vertical daisy-chain based scheme is shown in FIG. 17. The ROA circuit 1700 includes rings 1702a-b and pairs of inverters 1704a-b coupled between the rings 1702a-b. The ROA circuit 1700 further includes power gates 1706 coupled between respective pairs of inverters 1704a-b and one or both of the rings 1702a-b (e.g., between the pairs of inverters 1704a-b and the inner ring 1704b as shown in FIG. 17). The power gates 1706 may be used to turn the resonant oscillations off for selected rings or the whole array. In some embodiments, the power gates 1706 may be the sole mechanism to power off resonant clocking or turn off the oscillations in the ROA circuit 1700.

The individual power gates 1706 may include one or more transistors and/or other suitable switching devices. The power gates 1706 may be controllable by a power gate signal on a control line 1708. As shown, in FIG. 17, the control line 1708 may be coupled to the power gates 1706 of different RTWOs in a daisy-chain to control the RTWOs. In some embodiments, this scheme may be used to enable coarse/fine grained power gating with daisy chain (e.g., row, column, and/or hierarchical chaining) techniques to power on/off RTWOs of the ROA. Different control mechanisms may be used to selectively power gate specific regions of the ROA and/or specific ROA topologies of a multi-topology ROA.

Multi-Mode ROAs with Traveling and Standing Wave Operation

Various embodiments herein further provide ROA circuitry that is switchable between a traveling wave mode and a standing wave mode. Such as a scheme may be referred to as TSROA—traveling and standing wave based ROA. The TSROA circuitry may be used to distribute the clock signal across a large reticle size in a multi-die system, as described herein.

Figure 18:
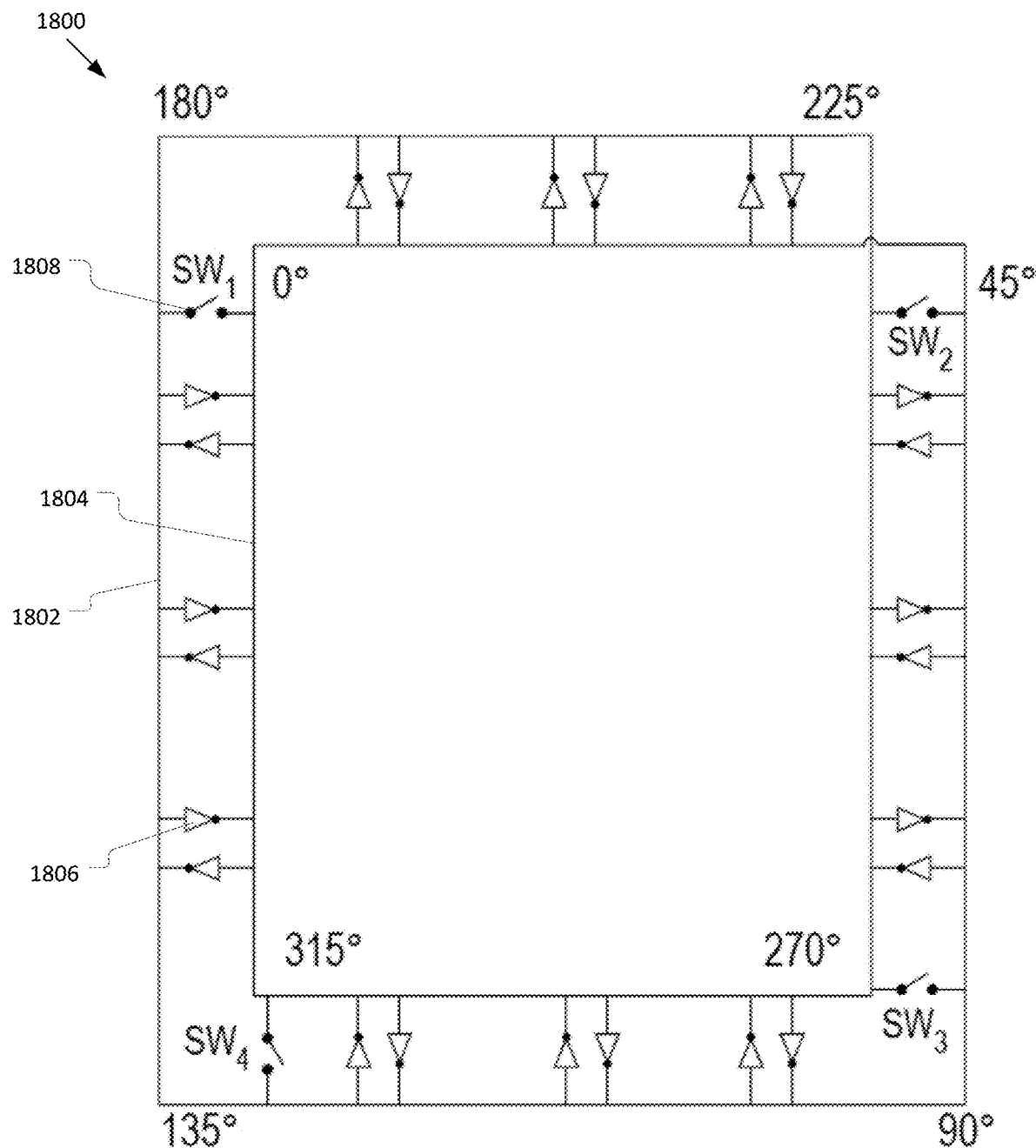
FIG. 18 illustrates an example multi-mode oscillator in accordance with various embodiments.

FIG. 18 illustrates an example multi-mode oscillator 1800 in accordance with various embodiments. The oscillator 1800 may include a first ring 1802 and a second ring 1804, with one or more inverter pairs 1806 coupled between the first ring 1802 and second ring 1804. Furthermore, one or more switches 1808 may be coupled between the first ring 1802 and second ring 1804 to selectively short the first ring 1802 with the second ring 1804. The example implementation of oscillator 1800 depicted in FIG. 18 includes 12 inverter pairs 1806 and 4 switches 1808. However, it will be apparent that other numbers of inverter pairs 1806 and switches 1808 may be used in other implementations.

The inverter pairs 1806 may compensate for transmission line losses (e.g., by injecting current to the rings 1802 and/or 1804. The switches 1808 may be off in the traveling wave mode. One of the switches 1808 may be switched on in the standing wave mode. By shorting one of the differential nodes on the RTWO structure, the RTWO may be forced to oscillate in the standing wave mode. The traveling wave is super-imposed creating a standing wave along the transmission lines. In embodiments that include multiple switches 1808, one of the switches 1808 may be selected to be closed in the standing wave mode, e.g., based on requirements for the resulting clock signal. In order to ensure the transition between the two modes is accurate, the delay incurred by the switches may require accurate characterization and may need to be accounted for in the control scheme. For example, in embodiments, the control signals provided to the switches 1808 to transition between the modes should arrive at the switches 1808 simultaneously or within a threshold of time to ensure that the mode switch is accurate.

Figure 19:
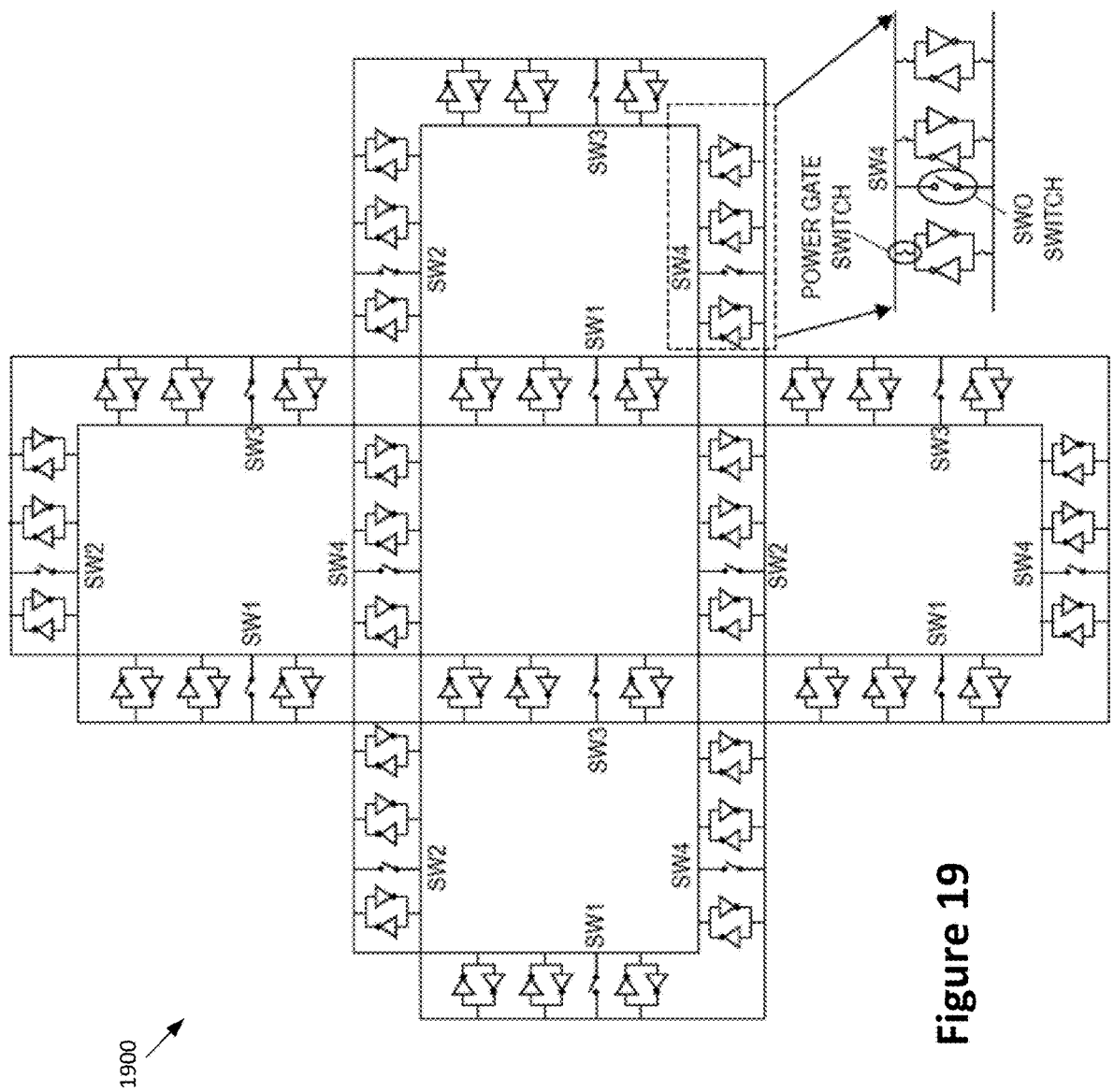
FIG. 19 illustrates an example oscillator circuit with a traveling wave mode and a standing wave mode, in accordance with various embodiments.

The multi-mode oscillator 1800 may be scaled using the ROA schemes described herein to form larger arrays. This structure may be used to distribute the clocks across a large die area. FIG. 19 illustrates one example implementation for a TSROA circuit 1900. The TSROA 1900 shown in FIG. 19 is a 4-ring ROA, although it will be apparent that other configurations may be used in various embodiments. This structure may be further scaled to distribute clocks across a large reticle size. The mode-control switches in the rotary rings may be configured (e.g., through Joint Test Action Group (JTAG) programming) or may be programmed from the platform.

Multi-Mode Clocking Scheme with Resonant Clocking and Non-Resonant Clocking

Various embodiments herein provide techniques for multi-mode clocking including resonant clocking and non-resonant clocking. The resonant clocking may include the ROA circuits and/or techniques described herein, including RTWOs and/or TSROAs that include both a traveling wave mode and a standing wave mode. The non-resonant clocking may include another suitable type of clocking circuit, such as PLL-based clock circuits, etc. The multi-mode clocking scheme may be used for clock signals distributed across a multi-die system.

In embodiments, the global clocking scheme may be selected between resonant and non-resonant mode based on one or more factors, such as operating frequency, one or more power requirements, one or more performance requirements, etc. The selection may be programmable, such as on-die or from the platform.

The power benefits of resonant clocking structures are attractive due to the charge recovery property. However, distribution of resonant clocks for regional/local clocking is extremely difficult due to circuit challenges including signal integrity and need for custom design. Accordingly, the multi-mode clocking scheme described herein may provide resonant clocking to be used as global clocking and combined with conventional local clocking to extract the benefits of existing local clocking. The hybrid clocking scheme incorporates global resonant-mode (RM) and local conventional mode (CM). The scheme may include buffered and/or buffer-less tree, spine, and/or trunk schemes to distribute high-performance clock signals with seamless synchronization and reduced power consumption. The global clocking is resonant (traveling/standing wave) mode which relies on charge recovery property to reduce power dissipation, and can scale to enable synchronization across large die-area with extremely low jitter and skew properties. The local clock network improves compatibility with traditional CMOS logic. Additionally, it is possible to preserve all the features and capabilities of clock-gating and other power saving techniques that are predominantly used in local clocking.

Furthermore, the clocking scheme may include dynamic switching between multiple clocking modes, as described further below. Reconfiguring between external clocks, a standing wave oscillator (SWO) and a traveling wave oscillator (TWO) enables power performance trade-off during operation. Further, combining the resonant mode with PLL and external clocking modes enables additional options to switch the modes based on power-performance-area needs.

Figure 20:
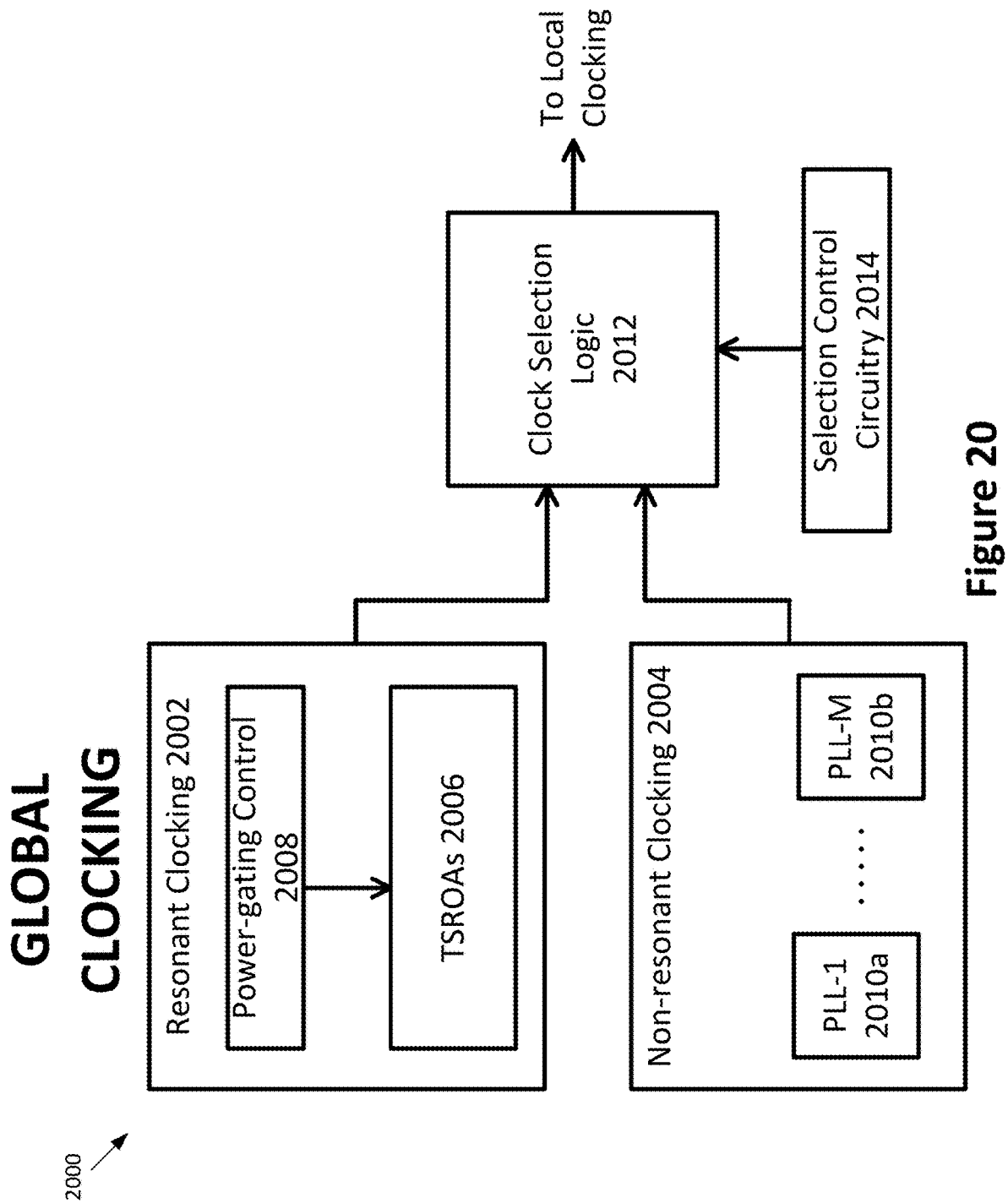
FIG. 20 illustrates an example multi-mode clocking circuit in accordance with various embodiments.

FIG. 20 illustrates an example multi-mode clocking circuit 2000 in accordance with various embodiments. Note that, in this scheme, it is also possible for resonant clocking and non-resonant (e.g., conventional) clocking to co-exist in the same design. In some embodiments, the techniques described above may be used for selectively power gating the rings as needed.

The circuit 2000 may include a resonant clocking circuitry 2002 and a non-resonant (e.g., conventional) clocking circuitry 2004. The resonant clocking circuitry 2002 may include one or more ROAs 2006. In some embodiments, the ROAs may be TSROAs that are switchable between a traveling wave mode and a standing wave mode (e.g., TSROA circuit 1900). Alternatively, the ROAs may be only operable as traveling wave oscillators or standing wave oscillators. The resonant clocking circuitry 2002 may further include power gating control circuitry 2008 to control power gating of the one or more ROAs 2006. For example, the power gating control circuitry 2008 may turn on or off selected portion(s) of individual ROAs, entire individual ROAs of a plurality of ROAs, and/or all rotary clocking.

The non-resonant clocking circuitry 2004 may include one or more clock circuits 2010a-b to generate non-resonant clock signals. The clock circuits 2010a-b may include, for example, PLLs as shown, and/or another suitable type of clock circuit.

The circuit 2000 may further include clock selection logic 2012 coupled to the resonant clock circuitry 2002 and the non-resonant clock circuitry 2004. The clock selection logic 2012 may receive the clock signals generated by the respective resonant clock circuitry 2002 and non-resonant clock circuitry 2004 and select one or more of the clock signals to provide as an output (e.g., for local clocking or one or more other clock domains). For example, the clock selection logic 2012 may include one or more multiplexers as further described below. The circuit 2000 may further include selection control circuitry 2014 to control the clock selection logic 2012. The selection control circuitry 2014 may control the clock selection logic 2012 based on one or more operating modes.

Figure 21:
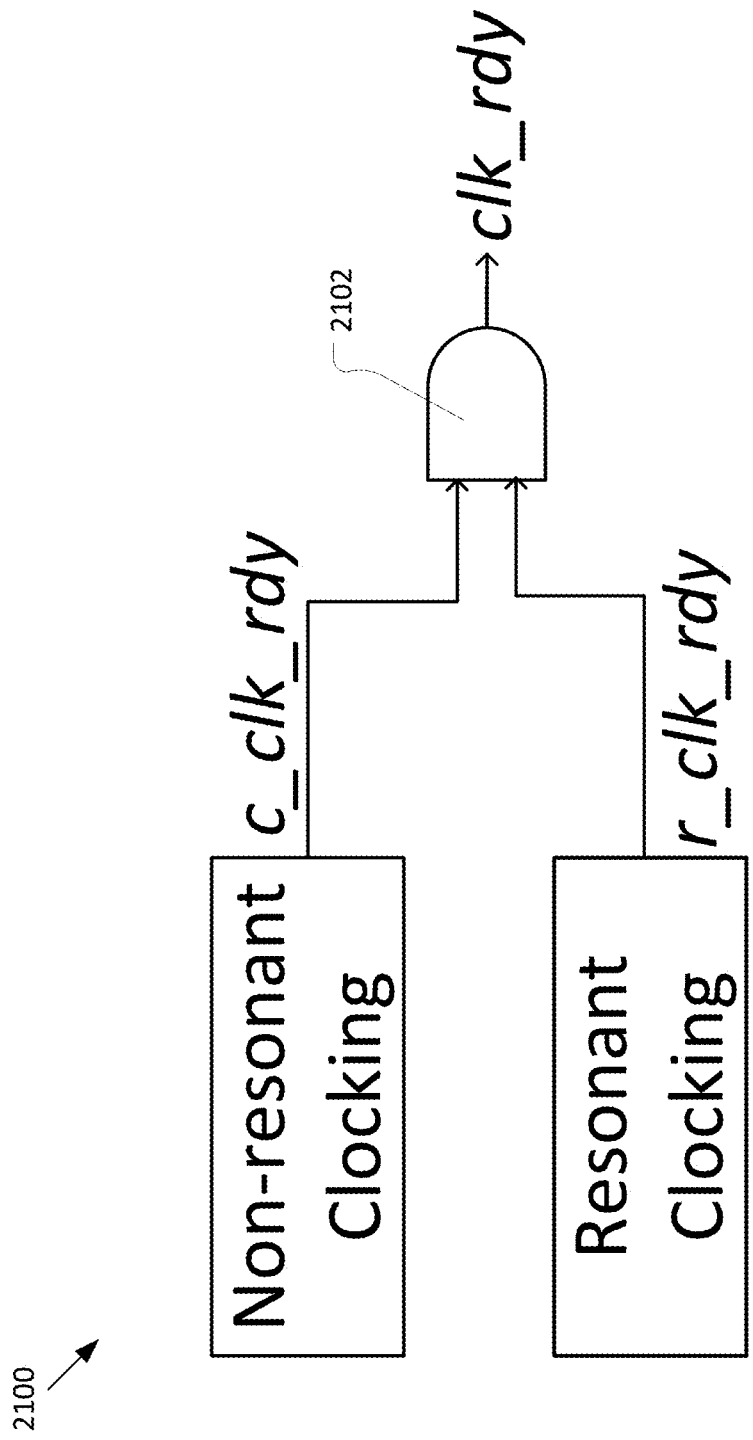
FIG. 21 illustrates an example ready circuit to generate a clock ready signal, in accordance with various embodiments.

FIG. 21 illustrates an example ready circuit 2100 to generate a clock ready signal, in accordance with various embodiments. The ready circuit 2100 may include circuitry (e.g., an AND gate 2102 and/or other suitable circuitry) to receive a first clock ready signal (c_clk_rdy) for non-resonant (e.g., conventional) clocking and a second clock ready signal (r_clk_rdy) for resonant clocking. The ready circuit 2100 may output a global clock ready signal (clk_rdy) that is asserted when both the first and second clock ready signals are asserted to indicate that both clock signals are ready for consumption. In some embodiments, the global clock ready signal may be provided to the clock selection logic 2012 and/or selection control circuitry 2014 to indicate that both the resonant clock signal(s) and non-resonant clock signal(s) are ready for consumption.

Figure 22:
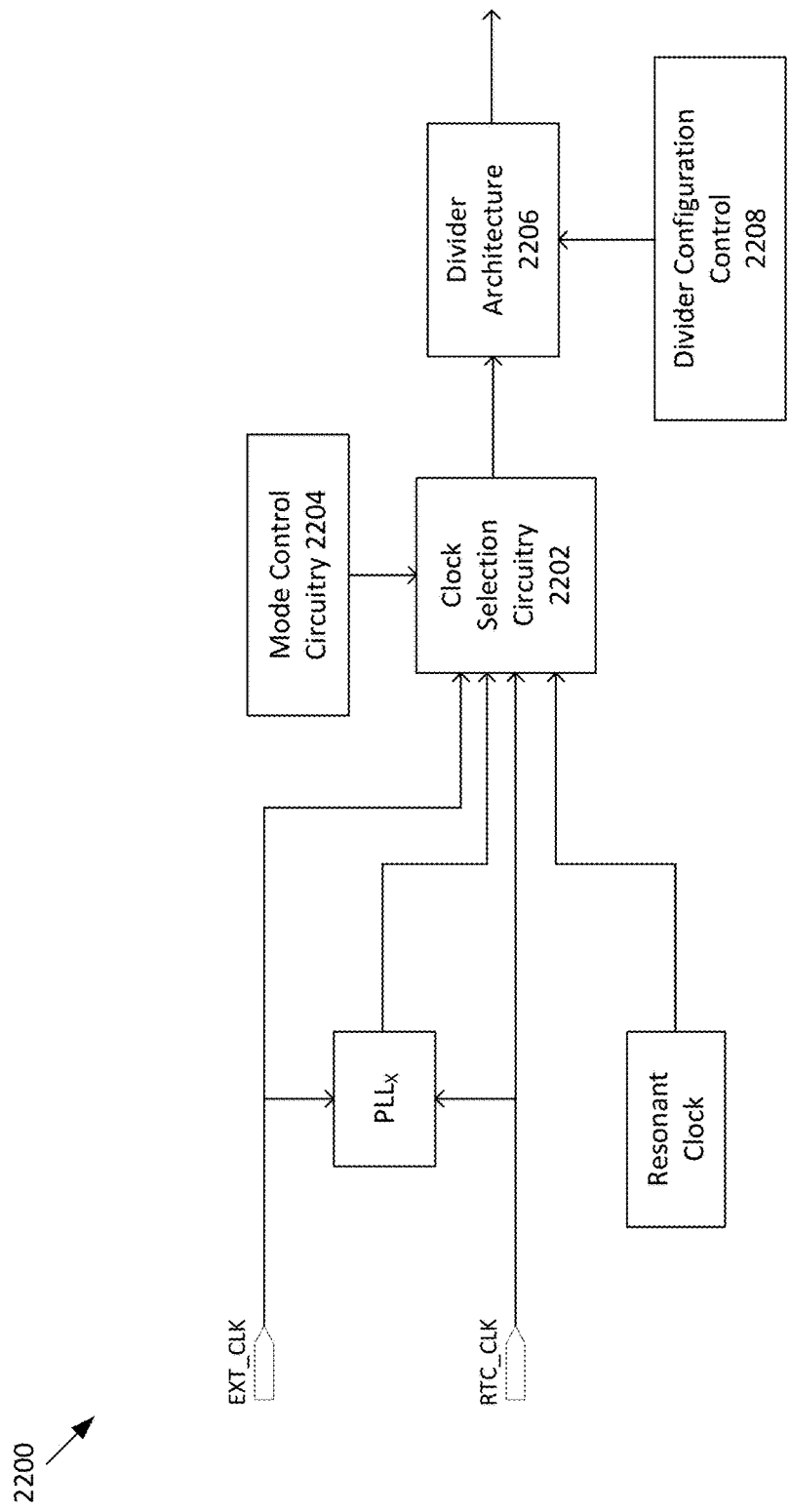
FIG. 22 illustrates an example multi-mode clocking circuit in accordance with various embodiments.

FIG. 22 illustrates an example multi-mode clocking circuit 2200 in accordance with various embodiments. The multi-mode clocking circuit 2200 may correspond to an example implementation of multi-mode clocking circuit 2000 of FIG. 20. The multi-mode clocking circuit 2200 may include a PLL clock ($PLL_x$), external clock (EXT_CLK), and/or a real-time clock (RTC_CLK) in addition to a resonant clock (e.g., traveling wave and/or standing wave resonant clock). Other suitable non-resonant clock sources may be used in some embodiments. The circuit 2200 may further include programmable selection circuitry 2202 to receive the plurality of clock signals and select one or more of the clock signals to use. The selection circuitry 2202 may be controlled by a mode control circuitry 2204.

In some embodiments, the output of the selection circuitry 2202 (e.g., the one or more selected clock signals) may be provided to a divider circuit 2206. The divider circuit 2206 may generate one or more divided versions of the clock signal(s), e.g., as controlled by a divider configuration control circuit 2208.

Note that these scheme of FIG. 22 may be used for global clock selection and provided as inputs for the local clocking (e.g., post-divider).

An example mode control configuration for selecting the operating mode is shown below in Table 1. As shown, the operating modes may include one or more of external clock, always-on ultra-low power mode, conventional clock, low frequency RTWO, high frequency RTWO, standing wave oscillator (SWO) mode, hybrid resonant mode, and/or hybrid clocking mode. Other operating modes and/or combinations of the operating modes may also be used. For example, while hybrid clocking mode is indicated to use both PLL and TSROA, the hybrid clocking mode may alternatively use ROA clocking without a standing wave mode. Furthermore, another type of non-resonant clock may be used instead of or in addition to a PLL clock.

TABLE 1

| Operating Mode | Type of Clock | Mode Control Configuration |
| --- | --- | --- |
| External clock | EXT_CLK | 000 |
| Always-on ultra-low power mode | RTC_CLK | 001 |
| Conventional clock | PLL_CLK | 010 |

TABLE 1-continued

| Operating Mode | Type of Clock | Mode Control Configuration |
|---|---|---|
| Low frequency RTWO | ROA | 011 |
| High frequency RTWO | ROA | 100 |
| SWO mode | SWO | 101 |
| Hybrid resonant mode | TSROA | 110 |
| Hybrid clocking mode | PLL + TSROA | 111 |

Figure 23:
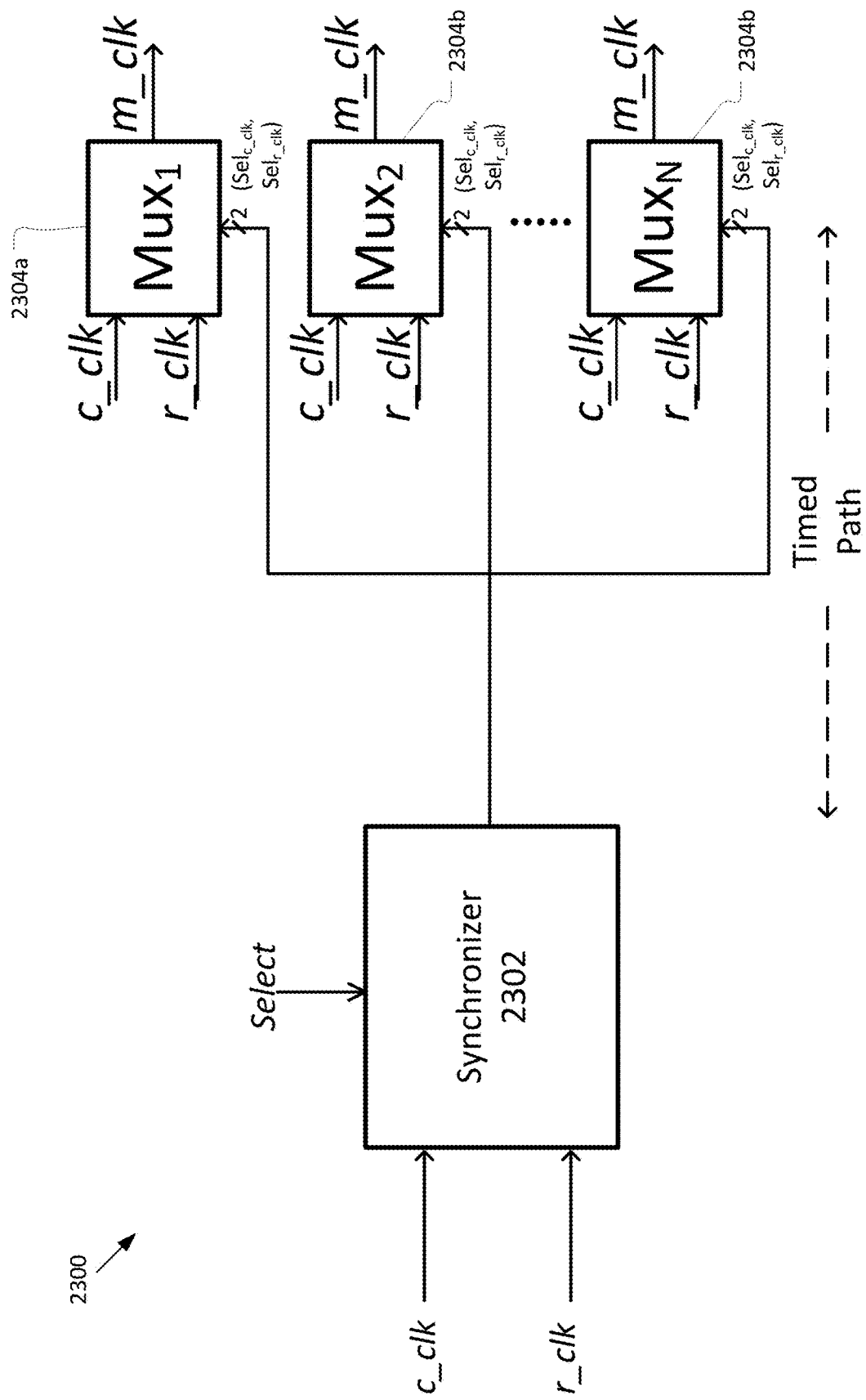
FIG. 23 illustrates an example selection logic for a multi-mode clocking circuit, in accordance with various embodiments.

FIG. 23 illustrates example selection logic 2300 in accordance with various embodiments. The selection logic 2300 may correspond to the clock selection logic 2012 of FIG. 20 and/or the clock selection circuitry 2202 of FIG. 22. The selection logic 2300 may select between resonant clocking (r_clk) and conventional/non-resonant clocking (c_clk) signals. For example, the selection logic 2300 may include a synchronizer 2302 to provide mode control signals to one or more multiplexers 2304a-c. In some embodiments, the mode control signal may be distributed to all the multiplexers 2304a-c at the same time (or within a threshold amount of time) to avoid potential synchronization issues.

In embodiments, the multiplexers 2304a-c may be associated with respective tap points on the resonant ring structure. The multiplexers 2304a-d may be implemented in respective dies and/or a base die of a multi-die system. For example, each die that is coupled to the base die may include one or more multiplexers 2304a-c.

Figure 24:
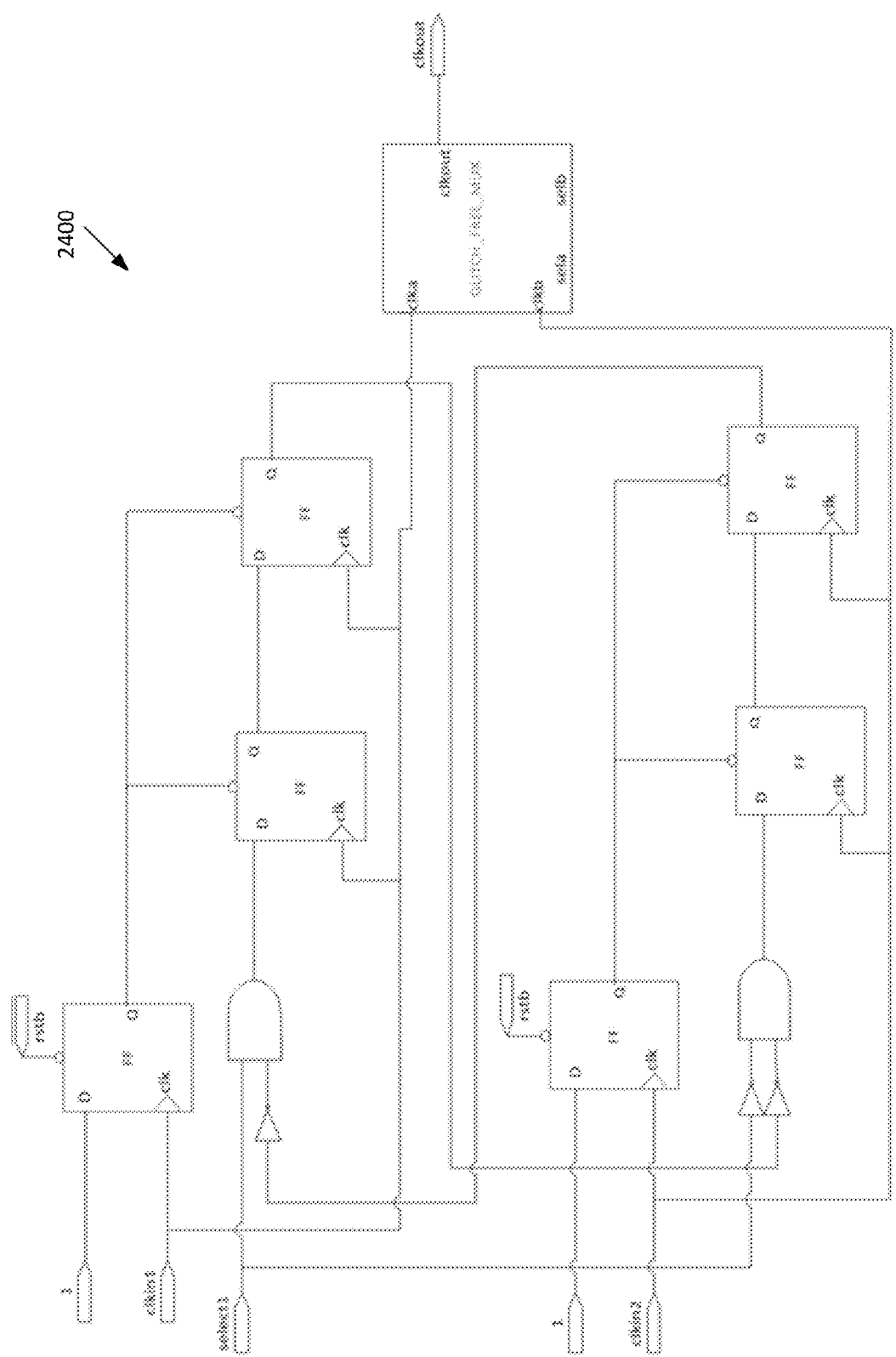
FIG. 24 illustrates an example implementation of the synchronizer of FIG. 23, in accordance with various embodiments.

Note that this can be generalized for any two input clocks (clka, clkb) with corresponding select signals (sela, selb). FIG. 24 illustrates an example implementation of a synchronizer 2400 that may correspond to the synchronizer 2242.

Figure 25:
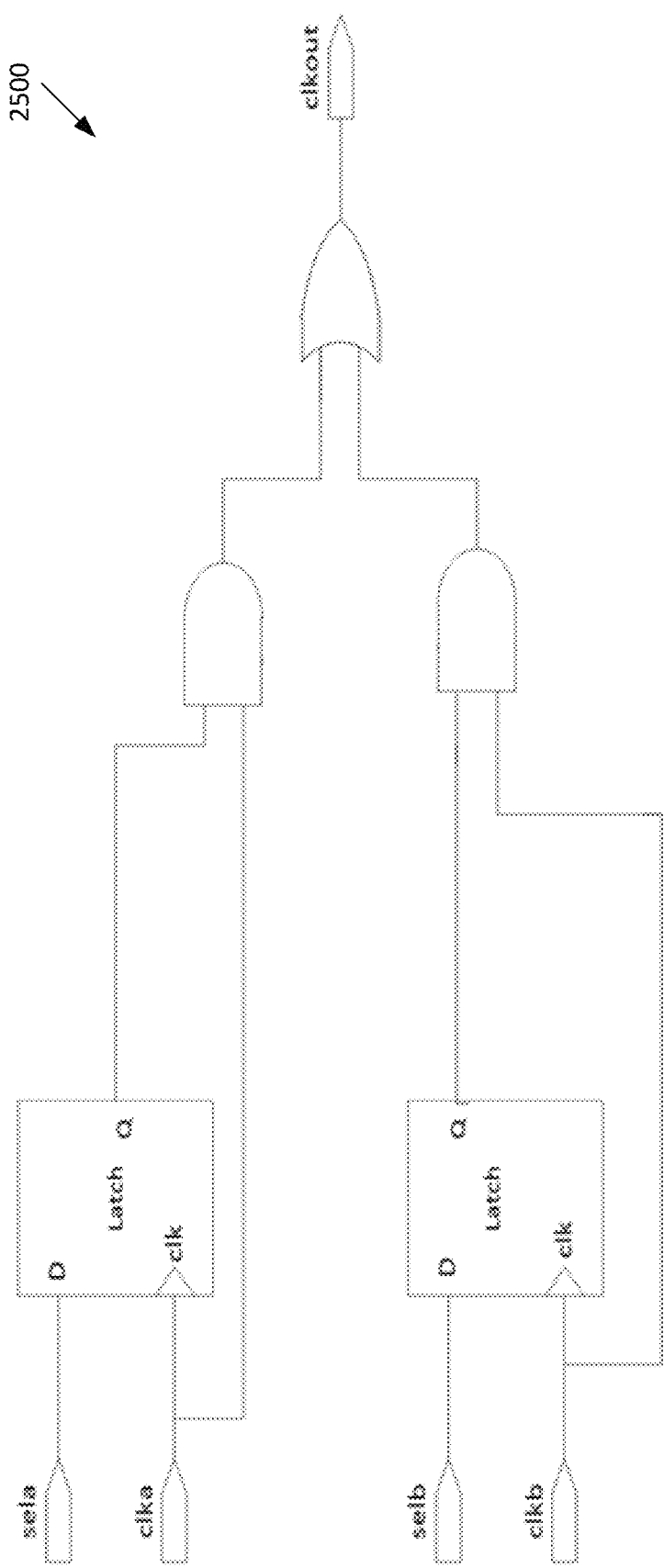
FIG. 25 illustrates an example implementation of the multiplexer of FIG. 23, in accordance with various embodiments.

In some embodiments, the multiplexers 2304a-c may be glitch-free multiplexers (muses). FIG. 25 illustrates an example implementation of a glitch free multiplexer 2500 that may correspond to the multiplexers 2304a-c.

Note that a synchronizer is pulled-out to provide select signals for the glitch-free multiplexers so that the signals reach the multiplexers in a timed manner (e.g., with the same latency to the multiplexers to reach the multiplexers at the same time). In embodiments, the same scheme can be extended to select a clock with multiple input clocks.

Figure 26B:
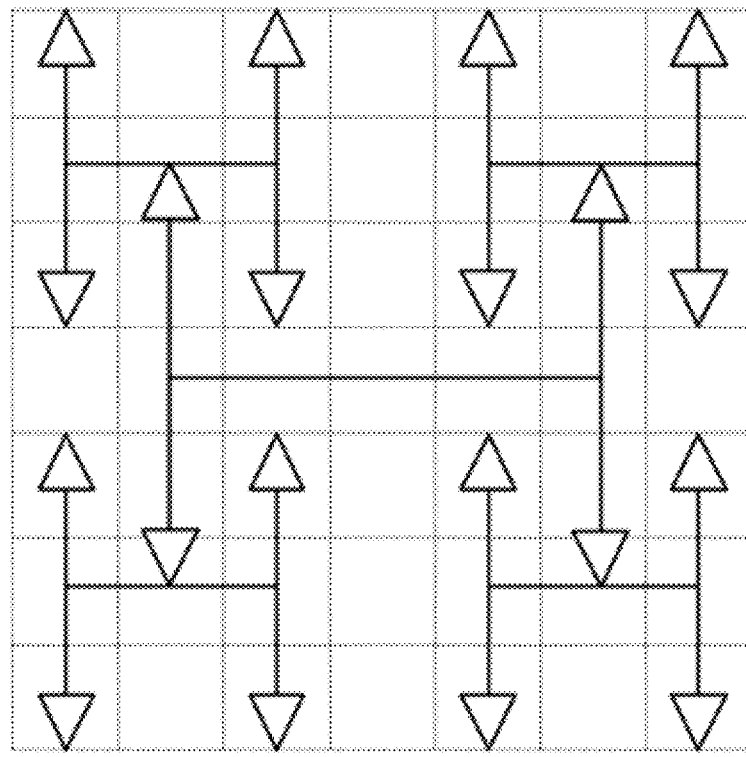
FIG. 26B illustrates an example h-tree that may be used to provide local clocking in accordance with various embodiments.
Figure 26A:
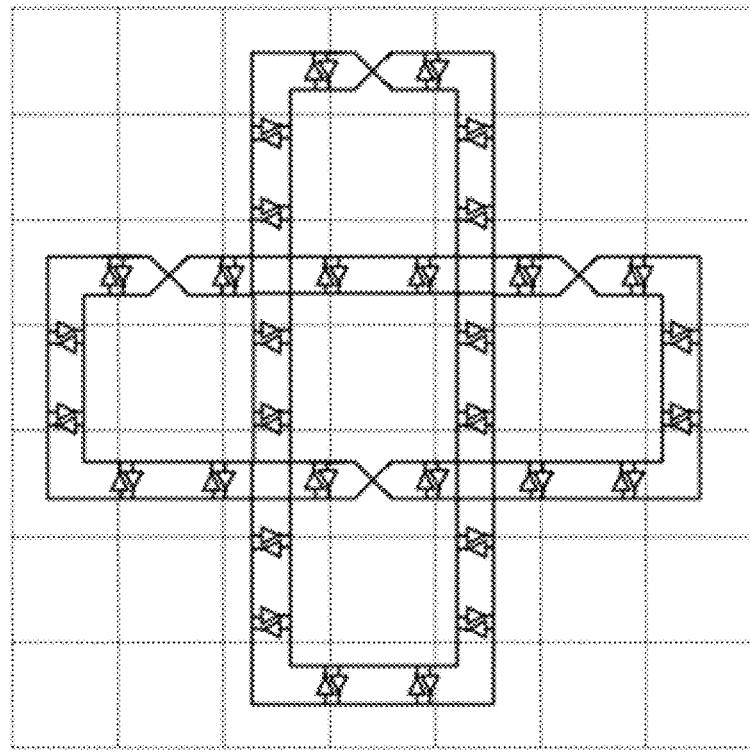
FIG. 26A illustrates an example 4-ring ROA (e.g., for global clocking), in accordance with various embodiments.
Figure 27:
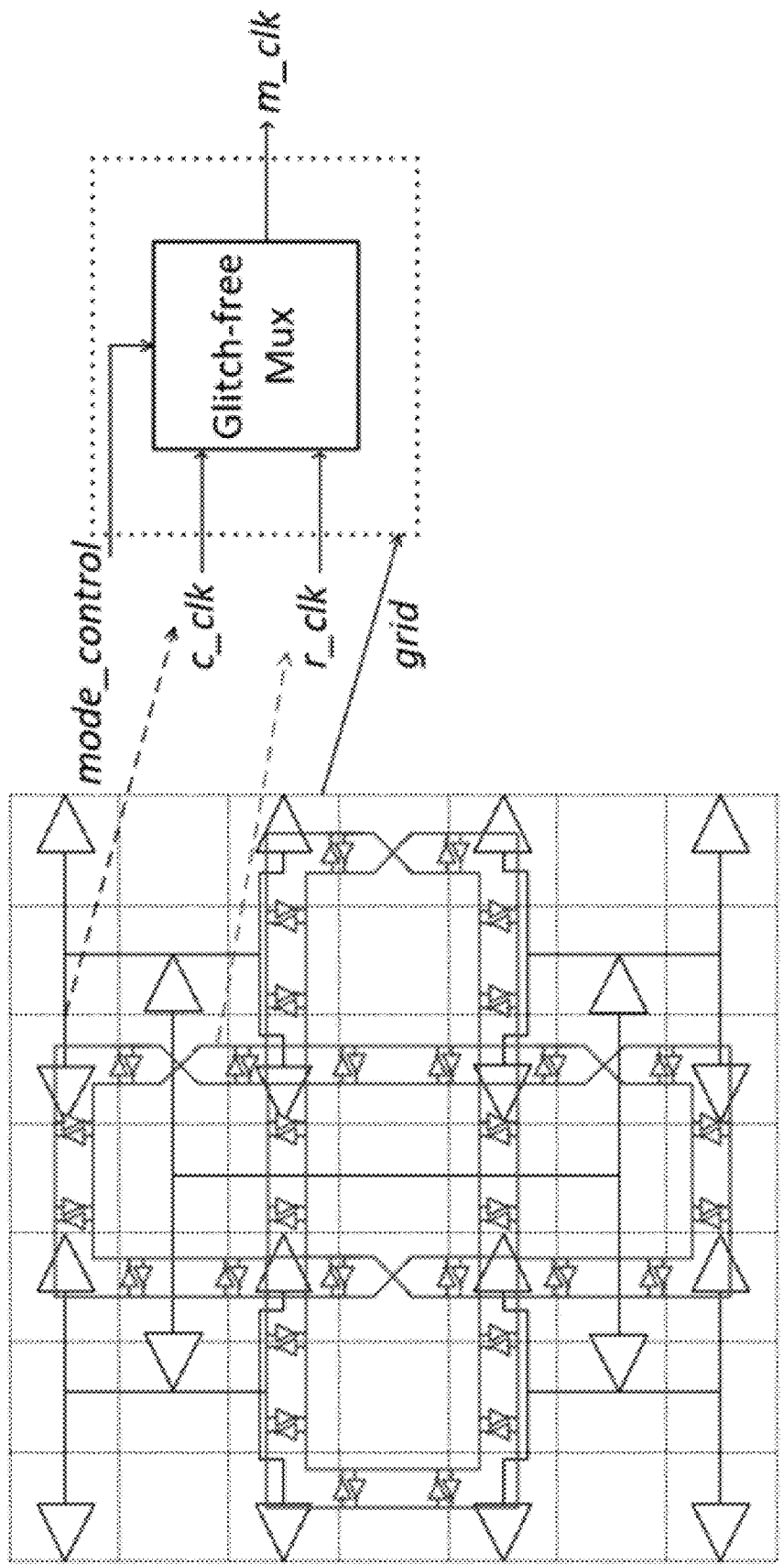
FIG. 27 illustrates a clocking circuit that includes an ROA for global clocking and an h-tree for local clocking, in accordance with various embodiments.

In various embodiments, the resonant rotary clocking and conventional clocking may be combined for power aware generation and efficient distribution of clock signals to regional/local clocking. A sample implementation of a 4-ring ROA (e.g., for global clocking) and h-tree (e.g., for local clocking) architectures are shown in FIG. 26A and FIG. 26B, respectively. The h-tree may be replaced or combined with any other conventional clock distribution scheme (such as, mesh, spine, trunk, etc.). FIG. 27 illustrates the overlapping grids of the ROA and h-tree circuits, and the clock selection logic for each grid. Note that, the clock/mode selection scheme described above may also be used for selection of a clock/mode in each grid.

Figure 28:
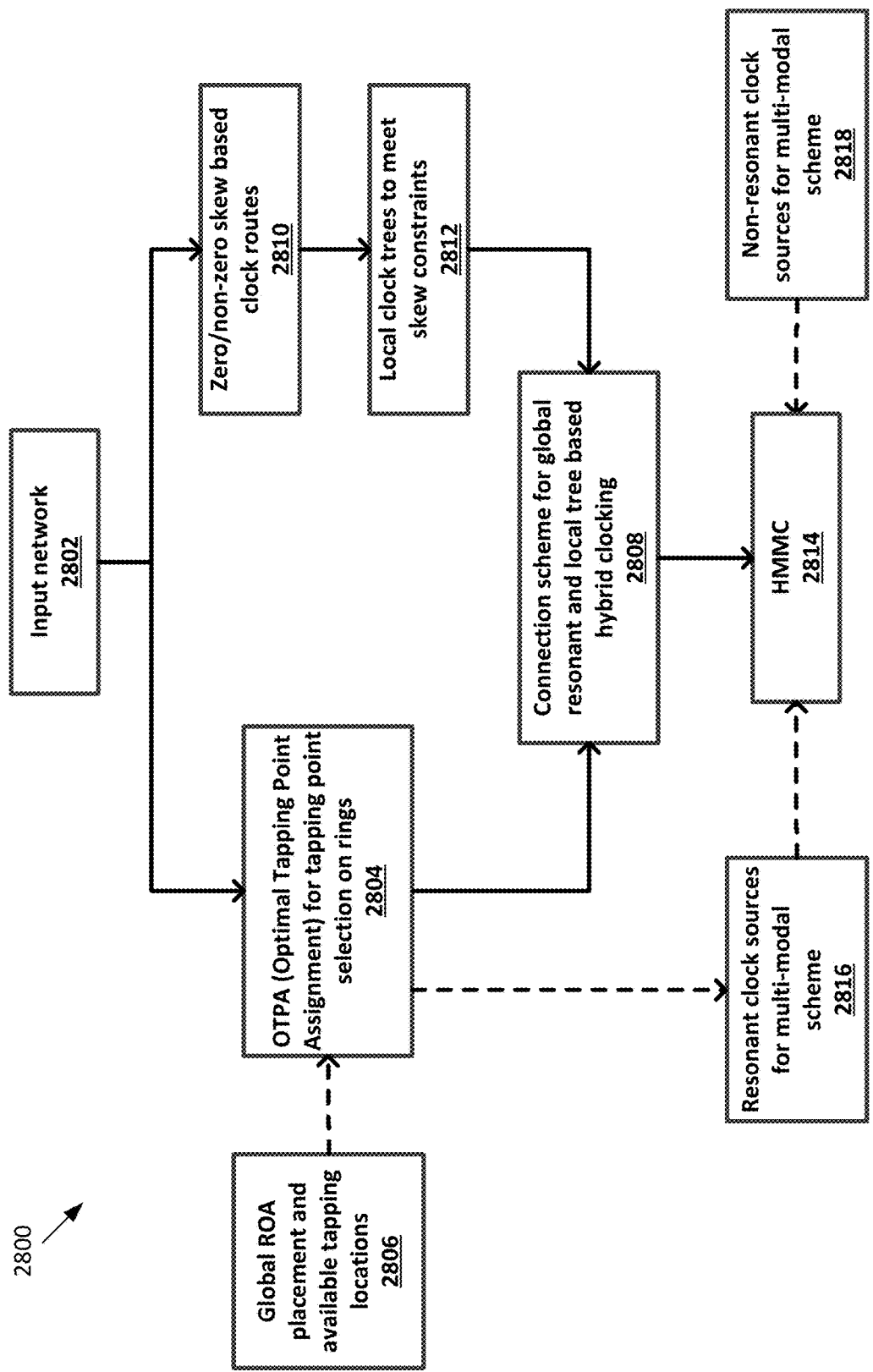
FIG. 28 illustrates a process for hybrid multi-modal clocking (HMMC) in accordance with various embodiments.

FIG. 28 illustrates a process 2800 for hybrid multi-modal clocking (HMMC) in accordance with various embodiments. The process 2800 may use global resonant rings and local trees as discussed herein. At 2802, the process may include an input clock network. At 2804, the process may include performing optimal tapping point assignment (OPTA) to identify the tapping points on the resonant rings from where the clocks should be tapped and provided to local clock distribution circuitry. The OPTA may be performed by solving a OPTA problem, e.g., using Integer Linear Programming (ILP) or any heuristic method. The OPTA problem may consider capacitive loading, wirelength, skew, and/or other factors as key constraints. The OPTA operation at 2804 may receive as an input global ROA placement information and available tapping locations (e.g., shown as 2806). When the tapping points are determined, the clock sources may be coupled to the determined tapping points at 2808.

For non-resonant clocking, block 2810 of the process 2800 may further include determining the type of clocking scheme, e.g., based on the input network and/or the skew (zero/non-zero). At 2812, the process 2800 may include building local clock trees to meet the skew restraints and/or other requirements. Block 2808 may further provide connections between the clock sources and local clock trees.

The process 2800 may further include, at 2814, performing HMMC using the resonant clock sources 2816 and non-resonant clock sources 2818, as further described herein.

Figure 29:
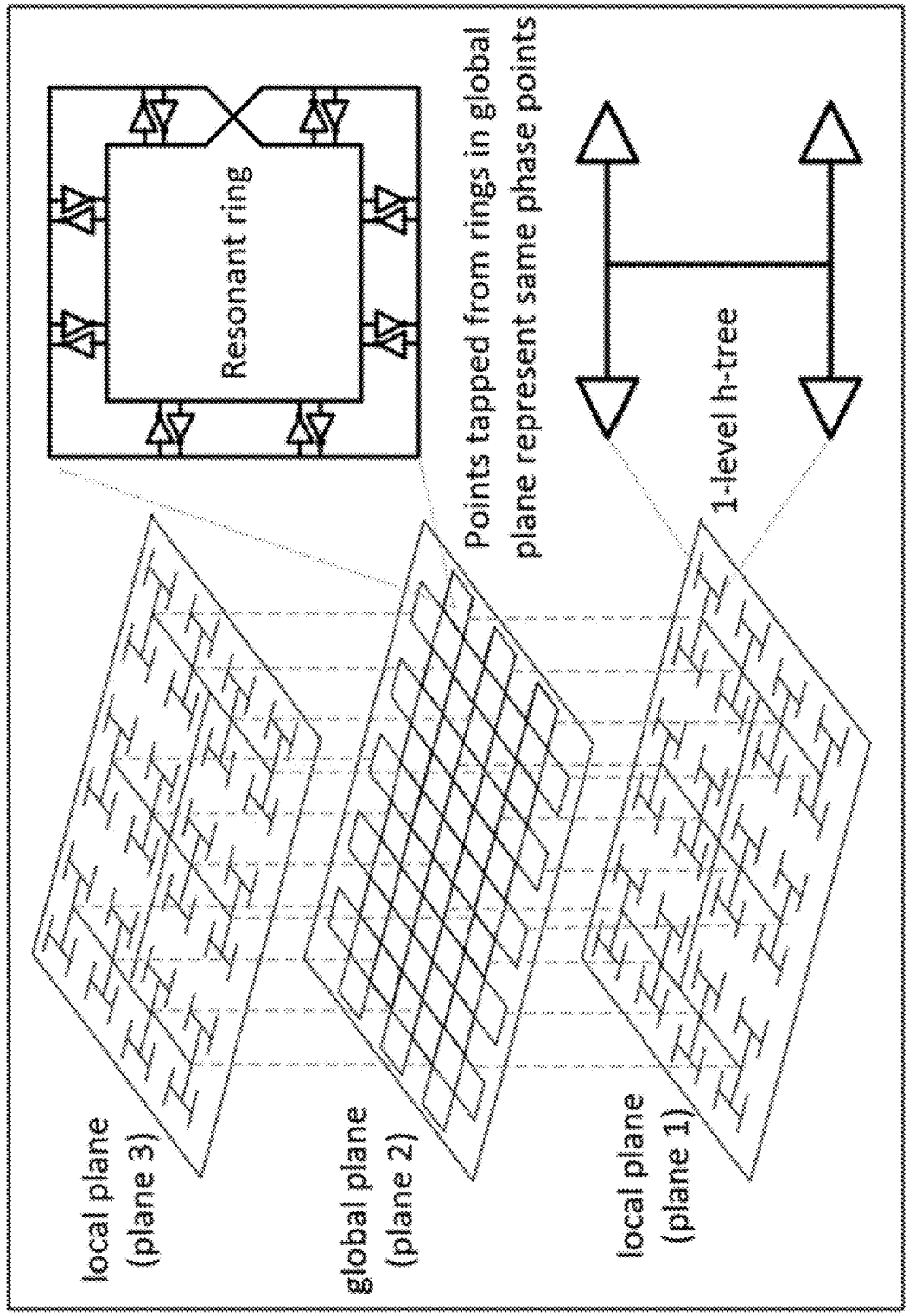
FIG. 29 illustrates an example implementation of HMMC in a three-dimensional integrated circuit, in accordance with various embodiments.

The embodiments described herein for multi-modal clocking (e.g., as described with respect to FIGS. 20-28) may be extended to enable the HMMC on 3-D integrated circuits. FIG. 29 illustrates one example implementation with 3 sample planes. Plane 2 (between planes 1 and 3) may include global ROA and planes 1 and 3 may include h-trees. Note that, the local clocking on different planes may be any suitable scheme with global plane having resonant rotary arrays as described herein.

Figure 30:
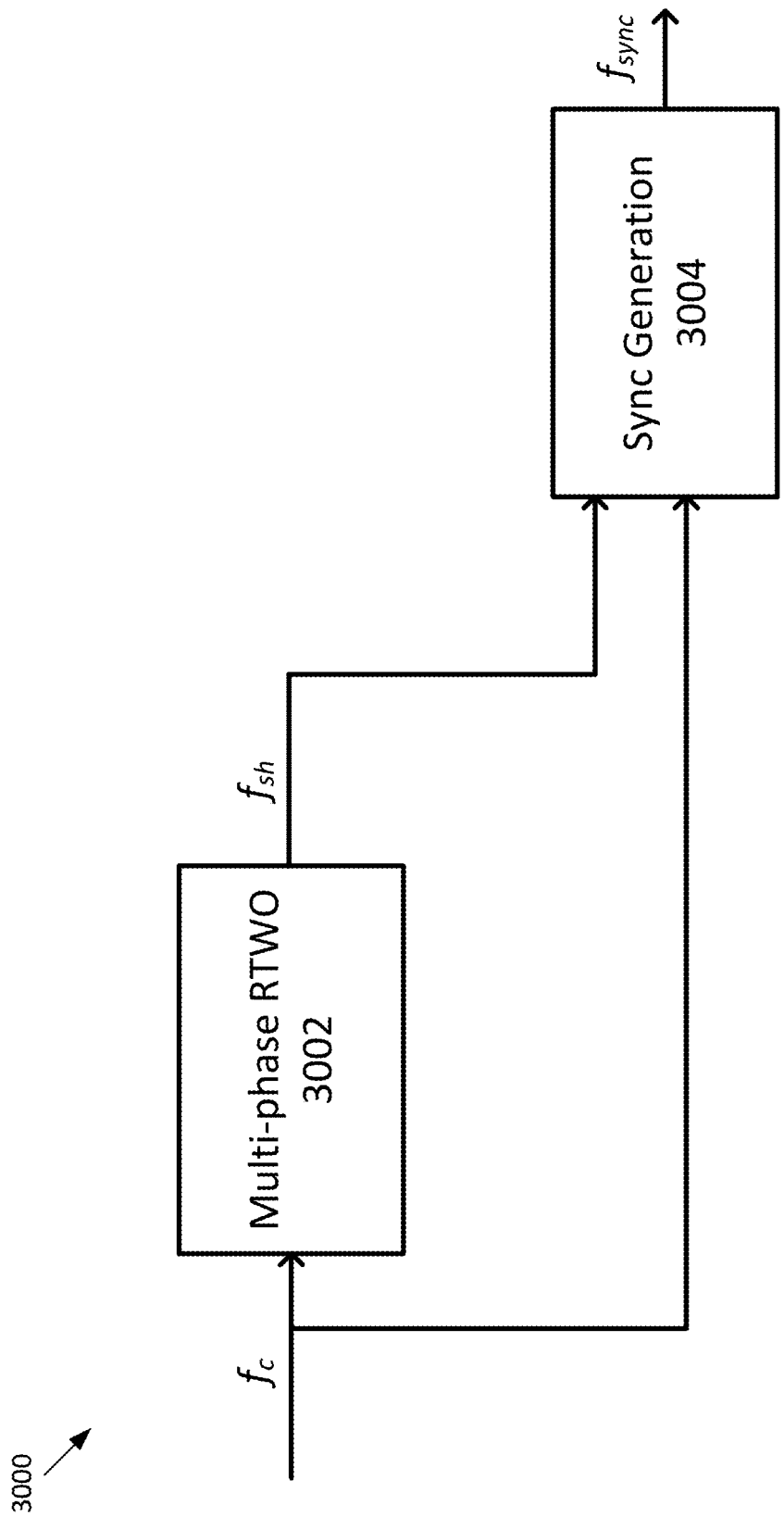
FIG. 30 illustrates an example circuit to use multi-phase RTWO for sync generation, in accordance with various embodiments.

Various embodiments further provide sample applications of using hybrid multi-modal resonant clocking. For example, traditionally, for shifted clock generation, a PLL can provide the required high frequency clock. However, for applications where the frequency requirements are high (e.g., the serializer/deserializer (SerDes) that serializes and deserializes digital data used in high-speed die-to-die communication may require ~8-12 Gbps data rate), generating these phase-shifted clocks from PLLs have power implications (e.g., due to high frequency requirements). Further, if the low-power high frequency resonant clocking is used as global clocking, the multi-phase points are already available for consumption. In some embodiments, resonant rotary clocking circuits with multiple phase points, as described herein, may be used to tap clocks (e.g., at the native frequency of the ring) for sync-generation (e.g., instead of clocks from other sources, such as a PLL). FIG. 30 illustrates an example circuit 3000 that uses a multi-phase RTWO circuit 3002 coupled to a synch generation circuit 3004 for sync generation ($f_{sync}$). The multi-phase RTWO circuit 3002 may be used instead of a shifted clock generation unit (e.g., that utilizes a PLL).

Figure 31:
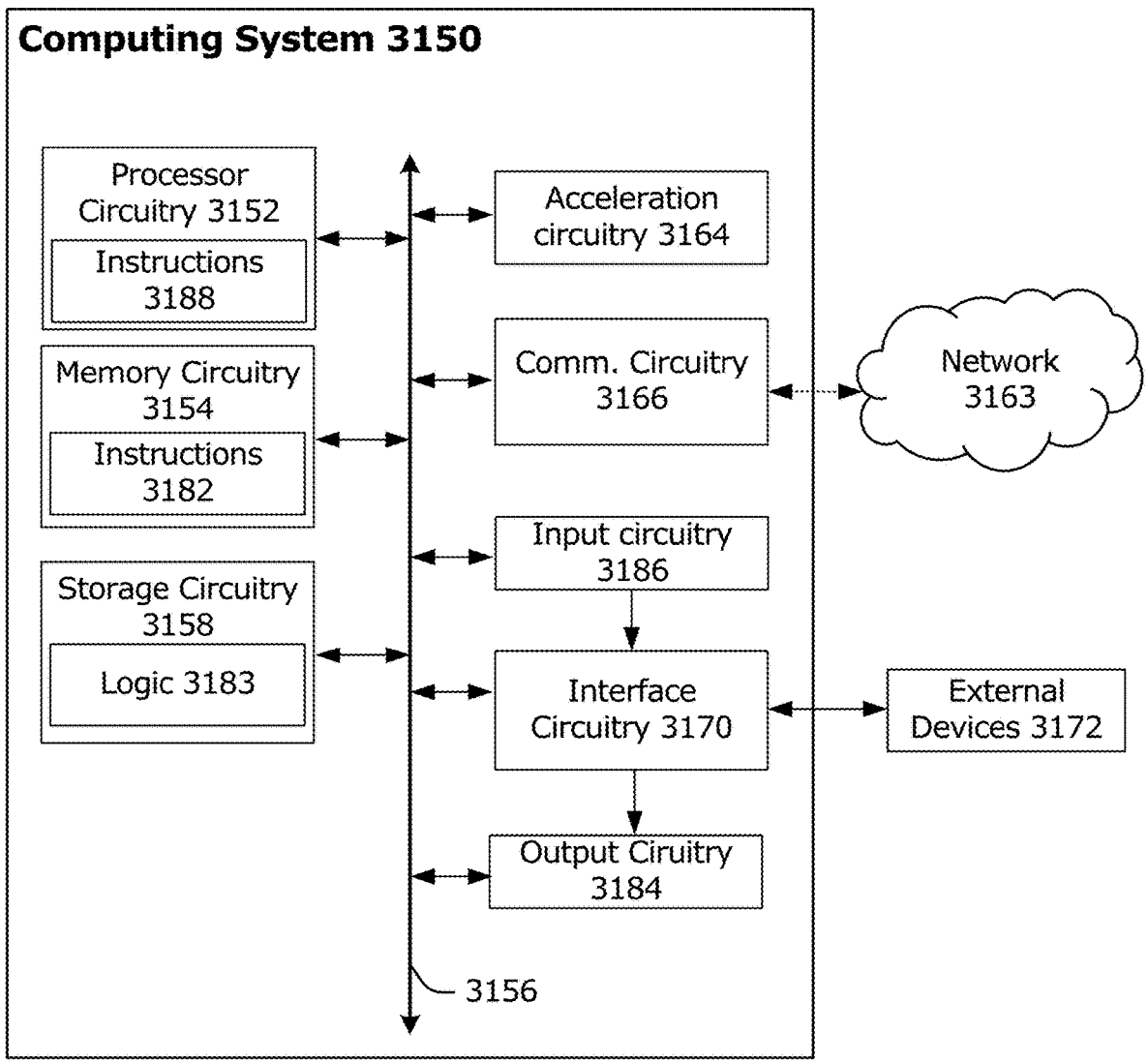
FIG. 31 illustrates an example system configured to employ the apparatuses and methods described herein, in accordance with various embodiments.

FIG. 31 illustrates an example of components that may be present in a computing system 3150 for implementing the techniques described herein. The computing system 3150 may include any combinations of the hardware or logical components referenced herein. The components may be implemented as ICs, portions thereof, discrete electronic devices, or other modules, instruction sets, programmable logic or algorithms, hardware, hardware accelerators, software, firmware, or a combination thereof adapted in the computing system 3150, or as components otherwise incorporated within a chassis of a larger system. For one embodiment, at least one processor 3152 may be packaged together with computational logic 3182 and configured to practice aspects of various example embodiments described herein to form a System in Package (SiP) or a System on Chip (SoC).

The system 3150 includes processor circuitry in the form of one or more processors 3152. The processor circuitry 3152 includes circuitry such as, but not limited to one or more processor cores and one or more of cache memory, low drop-out voltage regulators (LDOs), interrupt controllers, serial interfaces such as SPI, I2C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 3152 may include one or more hardware accelerators (e.g., same or similar to acceleration circuitry 3164), which may be microprocessors, programmable processing devices (e.g., FPGA, ASIC, etc.), or the like. The one or more accelerators may include, for example, computer vision and/or deep learning accelerators. In some implementations, the processor circuitry 3152 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein The processor circuitry 3152 may include, for example, one or more processor cores (CPUs), application processors, GPUs, RISC processors, Acorn RISC Machine (ARM) processors, CISC processors, one or more DSPs, one or more FPGAs, one or more PLDs, one or more ASICs, one or more baseband processors, one or more radio-frequency integrated circuits (RFIC), one or more microprocessors or controllers, a multi-core processor, a multithreaded processor, an ultra-low voltage processor, an embedded processor, or any other known processing elements, or any suitable combination thereof. The processors (or cores) 3152 may be coupled with or may include memory/storage and may be configured to execute instructions stored in the memory/storage to enable various applications or operating systems to run on the platform 3150. The processors (or cores) 3152 is configured to operate application software to provide a specific service to a user of the platform 3150. In some embodiments, the processor(s) 3152 may be a special-purpose processor(s)/controller(s) configured (or configurable) to operate according to the various embodiments herein.

As examples, the processor(s) 3152 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, California. However, any number other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centrig™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like.

In some implementations, the processor(s) 3152 and/or other components of the system 3150 may be a part of a system on a chip (SoC), System-in-Package (SiP), a multi-chip package (MCP), and/or the like, in which the processor(s) 3152 and other components are formed into a single integrated circuit, or a single package, such as the Edison™ or Galileo™ SoC boards from Intel® Corporation. Other examples of the processor(s) 3152 are mentioned elsewhere in the present disclosure. In embodiments, two or more components of the system 3150 may be on different dies that are coupled to a same base die. The base die may include resonant rings of a ROA, as described herein. The dies may tap the clock signal from the resonant rings at deterministic phase points, e.g., to provide a clock signal that is synchronized across the dies.

The system 3150 may include or be coupled to acceleration circuitry 3164, which may be embodied by one or more artificial intelligence (AI)/machine learning (ML) accelerators, a neural compute stick, neuromorphic hardware, an FPGA, an arrangement of GPUs, one or more SoCs (including programmable SoCs), one or more CPUs, one or more digital signal processors, dedicated ASICs (including programmable ASICs), PLDs such as complex (CPLDs) or high complexity PLDs (HCPLDs), and/or other forms of specialized processors or circuitry designed to accomplish one or more specialized tasks. These tasks may include AI/ML processing (e.g., including training, inferencing, and classification operations), visual data processing, network data processing, object detection, rule analysis, or the like. In FPGA-based implementations, the acceleration circuitry 3164 may comprise logic blocks or logic fabric and other interconnected resources that may be programmed (configured) to perform various functions, such as the procedures, methods, functions, etc. of the various embodiments discussed herein. In such implementations, the acceleration circuitry 3164 may also include memory cells (e.g., EPROM, EEPROM, flash memory, static memory (e.g., SRAM, anti-fuses, etc.) used to store logic blocks, logic fabric, data, etc. in LUTs and the like.

In some implementations, the processor circuitry 3152 and/or acceleration circuitry 3164 may include hardware elements specifically tailored for machine learning and/or artificial intelligence (AI) functionality. In these implementations, the processor circuitry 3152 and/or acceleration circuitry 3164 may be, or may include, an AI engine chip that can run many different kinds of AI instruction sets once loaded with the appropriate weightings and training code. Additionally or alternatively, the processor circuitry 3152 and/or acceleration circuitry 3164 may be, or may include, AI accelerator(s), which may be one or more of the aforementioned hardware accelerators designed for hardware acceleration of AI applications. As examples, these processor(s) or accelerators may be a cluster of artificial intelligence (AI) GPUs, tensor processing units (TPUs) developed by Google® Inc., Real AI Processors (RAPs™) provided by AlphaICs®, Nervana™ Neural Network Processors (NNPs) provided by Intel® Corp., Intel® Movidius™ Myriad™ X Vision Processing Unit (VPU), NVIDIA® PX™ based GPUs, the NM500 chip provided by General Vision®, Hardware 3 provided by Tesla®, Inc., an Epiphany™ based processor provided by Adapteva®, or the like. In some embodiments, the processor circuitry 3152 and/or acceleration circuitry 3164 and/or hardware accelerator circuitry may be implemented as AI accelerating co-processor(s), such as the Hexagon 685 DSP provided by Qualcomm®, the PowerVR 2NX Neural Net Accelerator (NNA) provided by Imagination Technologies Limited®, the Neural Engine core within the Apple® A11 or A12 Bionic SoC, the Neural Processing Unit (NPU) within the HiSilicon Kirin 3170 provided by Huawei®, and/or the like. In some hardware-based implementations, individual subsystems of system 3150 may be operated by the respective AI accelerating co-processor(s), AI GPUs, TPUs, or hardware accelerators (e.g., FPGAs, ASICs, DSPs, SoCs, etc.), etc., that are configured with appropriate logic blocks, bit stream(s), etc. to perform their respective functions.

The system 3150 also includes system memory 3154. Any number of memory devices may be used to provide for a given amount of system memory. As examples, the memory 3154 may be, or include, volatile memory such as random access memory (RAM), static RAM (SRAM), dynamic RAM (DRAM), synchronous DRAM (SDRAM), RAM-BUS® Dynamic Random Access Memory (RDRAM®), and/or any other desired type of volatile memory device. Additionally or alternatively, the memory 3154 may be, or include, non-volatile memory such as read-only memory (ROM), erasable programmable ROM (EPROM), electrically erasable programmable (EEPROM), flash memory, non-volatile RAM, ferroelectric RAM, phase-change memory (PCM), flash memory, and/or any other desired type of non-volatile memory device. Access to the memory 3154 is controlled by a memory controller. The individual memory devices may be of any number of different package types such as single die package (SDP), dual die package (DDP) or quad die package (Q17P). Any number of other memory implementations may be used, such as dual inline memory modules (DIMMs) of different varieties including but not limited to microDIMMs or MiniDIMMs.

Storage circuitry 3158 provides persistent storage of information such as data, applications, operating systems and so forth. In an example, the storage 3158 may be implemented via a solid-state disk drive (SSDD) and/or high-speed electrically erasable memory (commonly referred to as "flash memory"). Other devices that may be used for the storage 3158 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, a hard disk drive (HDD), micro HDD, of a combination thereof, and/or any other memory. The memory circuitry 3154 and/or storage circuitry 3158 may also incorporate three-dimensional (3D) cross-point (XPOINT) memories from Intel® and Micron®.

The memory circuitry 3154 and/or storage circuitry 3158 is/are configured to store computational logic 3183 in the form of software, firmware, microcode, or hardware-level instructions to implement the techniques described herein. The computational logic 3183 may be employed to store working copies and/or permanent copies of programming instructions, or data to create the programming instructions, for the operation of various components of system 3100 (e.g., drivers, libraries, application programming interfaces (APIs), etc.), an operating system of system 3100, one or more applications, and/or for carrying out the embodiments discussed herein. The computational logic 3183 may be stored or loaded into memory circuitry 3154 as instructions 3182, or data to create the instructions 3182, which are then accessed for execution by the processor circuitry 3152 to carry out the functions described herein. The processor circuitry 3152 and/or the acceleration circuitry 3164 accesses the memory circuitry 3154 and/or the storage circuitry 3158 over the interconnect (IX) 3156. The instructions 3182 direct the processor circuitry 3152 to perform a specific sequence or flow of actions, for example, as described with respect to flowchart(s) and block diagram(s) of operations and functionality depicted previously. The various elements may be implemented by assembler instructions supported by processor circuitry 3152 or high-level languages that may be compiled into instructions 3181, or data to create the instructions 3181, to be executed by the processor circuitry 3152. The permanent copy of the programming instructions may be placed into persistent storage devices of storage circuitry 3158 in the factory or in the field through, for example, a distribution medium (not shown), through a communication interface (e.g., from a distribution server (not shown)), over-the-air (OTA), or any combination thereof.

The IX 3156 couples the processor 3152 to communication circuitry 3166 for communications with other devices, such as a remote server (not shown) and the like. The communication circuitry 3166 is a hardware element, or collection of hardware elements, used to communicate over one or more networks 3163 and/or with other devices. In one example, communication circuitry 3166 is, or includes, transceiver circuitry configured to enable wireless communications using any number of frequencies and protocols such as, for example, the Institute of Electrical and Electronics Engineers (IEEE) 802.11 (and/or variants thereof), IEEE 802.7.4, Bluetooth® and/or Bluetooth® low energy (BLE), ZigBee®, LoRaWAN™ (Long Range Wide Area Network), a cellular protocol such as 3GPP LTE and/or Fifth Generation (5G)/New Radio (NR), and/or the like. Additionally or alternatively, communication circuitry 3166 is, or includes, one or more network interface controllers (NICs) to enable wired communication using, for example, an Ethernet connection, Controller Area Network (CAN), Local Interconnect Network (LIN), DeviceNet, ControlNet, Data Highway+, or PROFINET, among many others.

The IX 3156 also couples the processor 3152 to interface circuitry 3170 that is used to connect system 3150 with one or more external devices 3172. The external devices 3172 may include, for example, sensors, actuators, positioning circuitry (e.g., global navigation satellite system (GNSS)/Global Positioning System (GPS) circuitry), client devices, servers, network appliances (e.g., switches, hubs, routers, etc.), integrated photonics devices (e.g., optical neural network (ONN) integrated circuit (IC) and/or the like), and/or other like devices.

In some optional examples, various input/output (I/O) devices may be present within or connected to, the system 3150, which are referred to as input circuitry 3186 and output circuitry 3184 in FIG. 31. The input circuitry 3186 and output circuitry 3184 include one or more user interfaces designed to enable user interaction with the platform 3150 and/or peripheral component interfaces designed to enable peripheral component interaction with the platform 3150. Input circuitry 3186 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 3184 may be included to show information or otherwise convey information, such as sensor readings, actuator position(s), or other like information. Data and/or graphics may be displayed on one or more user interface components of the output circuitry 3184. Output circuitry 3184 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Crystal Displays (LCD), LED displays, quantum dot displays, projectors, etc.), with the output of characters, graphics, multimedia objects, and the like being generated or produced from the operation of the platform 3150. The output circuitry 3184 may also include speakers and/or other audio emitting devices, printer(s), and/or the like. Additionally or alternatively, sensor(s) may be used as the input circuitry 3184 (e.g., an image capture device, motion capture device, or the like) and one or more actuators may be used as the output device circuitry 3184 (e.g., an actuator to provide haptic feedback or the like). Peripheral component interfaces may include, but are not limited to, a non-volatile memory port, a USB port, an audio jack, a power supply interface, etc. In some embodiments, a display or console hardware, in the context of the present system, may be used to provide output and receive input of an edge computing system; to manage components or services of an edge computing system; identify a state of an edge computing component or service; or to conduct any other number of management or administration functions or service use cases.

The components of the system 3150 may communicate over the IX 3156. The IX 3156 may include any number of technologies, including ISA, extended ISA, I2C, SPI, point-to-point interfaces, power management bus (PMBus), PCI, PCIe, PCIx, Intel® UPI, Intel® Accelerator Link, Intel® CXL, CAPI, OpenCAPI, Intel® QPI, UPI, Intel® OPA IX, RapidIO™ system IXs, CCIX, Gen-Z Consortium IXs, a HyperTransport interconnect, NVLink provided by NVIDIA®, a Time-Trigger Protocol (TTP) system, a FlexRay system, PROFIBUS, and/or any number of other IX technologies. The IX 3156 may be a proprietary bus, for example, used in a SoC based system.

The number, capability, and/or capacity of the elements of system 3100 may vary, depending on whether computing system 3100 is used as a stationary computing device (e.g., a server computer in a data center, a workstation, a desktop computer, etc.) or a mobile computing device (e.g., a smartphone, tablet computing device, laptop computer, game console, IoT device, etc.). In various implementations, the computing device system 3100 may comprise one or more components of a data center, a desktop computer, a workstation, a laptop, a smartphone, a tablet, a digital camera, a smart appliance, a smart home hub, a network appliance, and/or any other device/system that processes data.

EXAMPLES

Some non-limiting examples of various embodiments are provided below.

Example 1 is a multi-die system comprising:
a base die that includes resonant rings of respective rotary traveling wave oscillators (RTWOs), wherein the resonant rings of different RTWOs are shorted to one another at respective shorting locations to form a rotary oscillator array (ROA);
a first die and a second die coupled to the base die, wherein the first and second dies are to tap respective clock signals from the resonant rings at respective tap points.

Example 2 may include the system of example 1 or some other example herein, wherein the resonant rings of the respective RTWOs include a first ring and a second ring that are cross-coupled to one another, wherein the RTWOs further include one or more pairs of cross-coupled inverters that are coupled between the first ring and the second ring.

Example 3 may include the system of example 2 or some other example herein, wherein the inverters are included in the base die.

Example 4 may include the system of example 2 or some other example herein, wherein the inverters are included in at least one of the first die or the second die.

Example 5 may include the system of example 4 or some other example herein, wherein the inverters are coupled to the resonant rings via micro-bumps.

Example 6 may include the system of example 2-5 or some other example herein, wherein the RTWOs include a first RTWO and a second RTWO, wherein the first ring of the first RTWO is shorted to the second ring of the second RTWO and the second ring of the first RTWO is shorted to the first ring of the second RTWO.

Example 7 may include the system of example 1-6 or some other example herein, wherein the ROA includes multiple sets of one or more RTWOs, wherein individual sets have: a first configuration that includes four RTWOs, wherein each of the four RTWOs are shorted to two others of the four RTWOs; a second configuration that includes two RTWOs shorted to one another; a third configuration that includes a single RTWO; or a fourth configuration that includes five RTWOs, wherein the five RTWOs include a first RTWO that is coupled to each of the other RTWOs of the five RTWOs.

Example 8 may include the system of example 1-7 or some other example herein, wherein the resonant rings are first resonant rings, and wherein the first die further includes one or more second resonant rings that are coupled to the first resonant ring at one or more locations.

Example 9 may include the system of example 1-8 or some other example herein, wherein the resonant rings are selectively shorted to one another via respective pass gates.

Example 10 may include the system of example 9 or some other example herein, further comprising one or more enable circuits, wherein individual enable circuits are to control respective sets of one or more of the pass gates.

Example 11 may include the system of example 10 or some other example herein, wherein the enable circuits are to sequentially turn on the respective sets of one or more pass gates in a daisy chain.

Example 12 may include the system of example 10-11 or some other example herein, wherein the enable circuits are to: detect a phase difference between two of the RTWOs that are shorted to one another via a pass gate; and turn on the respective set of pass gates based on the detected phase difference.

Example 13 may include the system of example 12 or some other example herein, wherein the enable circuit is to turn on the respective set of one or more pass gates based on a determination that the detected phase difference is less than a threshold.

Example 14 may include the system of example 10-13 or some other example herein, wherein the enable circuits are to generate a phase lock signal to indicate that all the RTWOs are powered on and phase locked.

Example 15 may include the system of example 10-14 or some other example herein, wherein at least one of the enable circuits is in the base die.

Example 16 may include the system of example 10-15 or some other example herein, wherein at least one of the enable circuits is in the first or second die.

Example 17 may include the system of example 1-16 or some other example herein, wherein the individual RTWOs include one or more tunable capacitors coupled to the resonant rings of the respective RTWO, and wherein the system further comprises frequency tuning circuits coupled to respective RTWOs to: detect a frequency mismatch associated with the respective RTWO; and control the tunable capacitors based on the detected frequency mismatch.

Example 18 may include the system of example 17 or some other example herein, wherein the frequency mismatch corresponds to a difference between a clock frequency of the respective RTWO and a target frequency.

Example 19 may include the system of example 17 or some other example herein, wherein the frequency mismatch corresponds to a difference between a clock frequency of the respective RTWO and a clock frequency of another RTWO.

Example 20 may include the system of example 17-19 or some other example herein, wherein the frequency tuning circuits are to generate a frequency lock signal to indicate when the frequency of all of the RTWOs has locked.

Example 21 may include the system of example 14 and 20 or some other example herein, further comprising a ready circuit to receive the phase lock signal and the frequency lock signal and generate a ready signal based on the phase lock signal and the frequency lock signal.

Example 22 may include the system of examples 14-21 or some other example herein, wherein the resonant rings include resonant rings of at least a first ring topology and a second ring topology that are different from one another.

Example 23 may include the system of example 22, wherein the first ring topology is to generate a first clock signal and the second ring topology is to generate a second clock signal, wherein the second clock signal is a frequency scaled version of the first clock signal.

Example 24 may include the system of example 22-23 or some other example herein, further comprising a transistor coupled between the first and second ring topologies to selective short the first and second ring topologies together.

Example 25 may include the system of example 22-24 or some other example herein, wherein the resonant rings further include resonant rings of a third ring topology that is different from the first and second ring topologies.

Example 26 may include the system of example 25 or some other example herein, wherein the first ring topology has a frequency f, the second ring topology has a frequency f/3, and the third ring topology has a frequency f/9.

Example 27 may include the system of example 22-26 or some other example herein, wherein the resonant rings of the first and second ring topologies overlap with one another within the base die in a horizontal direction.

Example 28 may include the system of example 22-27 or some other example herein, wherein at least one of the first or second ring topologies has an irregular shape.

Example 29 may include the system of example 1-28 or some other example herein, wherein the RTWOs include a first RTWO and a second RTWO, and wherein the system further comprises one or more doubler circuits coupled between the first and second RTWOs to provide the second RTWO with a frequency that is double a frequency of the first RTWO.

Example 30 may include the system of examples 2-29 or some other example herein, wherein at least one of the RTWOs further includes one or more switches, wherein individual switches are coupled between the respective one or more pairs of inverters and the first ring or the second ring.

Example 31 may include the system of example 30 or some other example herein, wherein the switches are to selectively uncouple the respective one or more pairs of inverters from the first ring or the second ring to selectively power gate the respective RTWO.

Example 32 may include the system of example 30-31 or some other example herein, further comprising control circuitry to control the switches to selectively power gate some or all of the RTWOs.

Example 33 may include the system of example 1-32 or some other example herein, wherein the RTWOs are operable in a traveling wave mode and a standing wave mode.

Example 34 may include the system of example 33 or some other example herein, wherein the RTWOs include one or more switches coupled between the first ring and the second ring of the respective RTWOs, wherein a selected one of the one or more switches is to be closed when the RTWOs are in the standing wave mode and the one or more switches are to be open when the RTWOs are in the traveling wave mode.

Example 35 may include an interposer comprising:
a resonant ring structure that include a plurality of resonant rings coupled to one another to form a resonant oscillator array (ROA); and
tap points coupled to the resonant ring structure to provide synchronized clock signals with deterministic phase points.

Example 36 may include the interposer of example 35, wherein the synchronized clock signals are to be provided to two or more dies.

Example 37 may include the interposer of example 35 or some other example herein, wherein the resonant rings form a plurality of RTWOs that include a first ring and a second ring that are cross-coupled to one another, wherein the RTWOs further include one or more pairs of cross-coupled inverters that are coupled between the first ring and the second ring.

Example 38 may include the system of example 37 or some other example herein, wherein the inverters are included in the interposer.

Example 39 may include the system of example 37 or some other example herein, wherein the inverters are included in one or more dies that are to receive the synchronized clock signals.

Example 40 may include an apparatus comprising:
resonant clock circuitry to provide one or more resonant clock signals;
non-resonant clock circuitry to provide one or more non-resonant clock signals; and
clock selection circuitry to select one or more clock signals from the one or more resonant clock signals or the one or more non-resonant clock signals and output the one or more selected clock signals.

Example 41 may include the apparatus of example 40, wherein the one or more selected clock signals are output to respective dies of a multi-die system.

Example 42 may include the apparatus of example 41, wherein one or more of the resonant clock signals are to be used by the dies for global clocking by the dies and one or more of the non-resonant clock signals are to be used by the dies for local clocking.

Example 43 may include the apparatus of example 40-42 or some other example herein, wherein the clock selection circuitry is to select the one or more clock signals based on an operating mode of the apparatus.

Example 44 may include the apparatus of example 43 or some other example herein, wherein the operating mode includes one or more of an external clock mode, a real-time clock (RTC) mode, a phase-locked loop (PLL) clock mode, a rotary traveling wave oscillator (RTWO) mode, a low frequency RTWO mode, a high frequency RTWO mode, a standing wave oscillator (SWO) mode, a hybrid resonant mode, or a hybrid clocking mode Example 45 may include the apparatus of example 40-44 or some other example herein, wherein the resonant clock circuitry is switchable between a traveling wave mode and a standing wave mode.

Example 46 may include the apparatus of example 40-45 or some other example herein, wherein the one or more non-resonant clock signals include one or more of a phase-locked loop (PLL) clock, a real-time clock, or an external clock.

Example 47 may include the apparatus of example 40-46 or some other example herein, wherein the clock selection circuitry includes a plurality of multiplexers to provide the selected one or more clock signals to respective outputs.

Example 48 may include the apparatus of example 47 or some other example herein, wherein the multiplexers are glitch-free multiplexers.

Example 49 may include the apparatus of example 47-48 or some other example herein, wherein the clock selection circuitry further includes a synchronizer to provide synchronized control signals to the plurality of multiplexers.

Example 50 may include the apparatus of example 40-49 or some other example herein, wherein the rotary clocking circuitry includes resonant rings of respective rotary traveling wave oscillators (RTWOs), wherein the resonant rings of different RTWOs are shorted to one another at respective shorting locations to form a rotary oscillator array (ROA).

Example 51 may include the apparatus of example 50 or some other example herein, wherein the resonant rings are implemented in a base die of a multi-die system that includes a plurality of other dies coupled to the base die.

Example 52 may include the apparatus of example 50-51 or some other example herein, wherein the resonant rings of the respective RTWOs include a first ring and a second ring that are cross-coupled to one another, wherein the RTWOs further include one or more pairs of cross-coupled inverters that are coupled between the first ring and the second ring.

Example 53 may include the apparatus of example 52 or some other example herein, wherein the inverters are included in the base die.

Example 54 may include the apparatus of example 52 or some other example herein, wherein the inverters are included in at least one of the other dies that are coupled to the base die.

Example 55 may include the apparatus of example 40-54 or some other example herein, wherein the non-resonant clocking circuitry includes clock distribution circuitry to distribute the one or more non-resonant clock signals within the apparatus.

Example 56 may include the apparatus of example 55 or some other example herein, wherein the clock distribution circuitry includes an h-tree, a mesh, a spine, or a trunk.

Example 57 may include a multi-die system comprising:

a base die that includes resonant rings of a rotary oscillator array, wherein the resonant rings are shorted to one another at respective shorting locations;

a first die and a second die coupled to the base die, wherein the first and second dies are to tap a clock signal from the resonant rings at respective tap points.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second, or third) for identified elements are used to distinguish between the elements, and do not indicate or imply a required or limited number of such elements, nor do they indicate a particular position or order of such elements unless otherwise specifically stated.

What is claimed is:

1. A multi-die system comprising:
   a base die that includes resonant rings of respective rotary traveling wave oscillators (RTWOs), wherein the resonant rings of different RTWOs are shorted to one another at respective shorting locations to form a rotary oscillator array (ROA);
   pass gates to selectively short respective pairs of the resonant rings to one another;
   one or more enable circuits, wherein individual enable circuits are to control respective sets of one or more of the pass gates; and
   a first die and a second die coupled to the base die, wherein the first and second dies are to tap respective clock signals from the resonant rings at respective tap points.

2. The system of claim 1, wherein the resonant rings of the respective RTWOs include a first ring and a second ring that are cross-coupled to one another, wherein the RTWOs further include one or more pairs of cross-coupled inverters that are coupled between the first ring and the second ring.

3. The system of claim 2, wherein the inverters are included in the base die.

4. The system of claim 2, wherein the inverters are included in at least one of the first die or the second die.

5. The system of claim 2, wherein the RTWOs include a first RTWO and a second RTWO, wherein the first ring of the first RTWO is shorted to the second ring of the second RTWO and the second ring of the first RTWO is shorted to the first ring of the second RTWO.

6. The system of claim 1, wherein the resonant rings are first resonant rings, and wherein the first die further includes one or more second resonant rings that are coupled to the first resonant ring at one or more locations.

7. The system of claim 1, wherein the enable circuits are to:
   detect a phase difference between the respective pair of RTWOs that are shorted to one another via a pass gate; and
   turn on the respective set of one or more pass gates based on the detected phase difference.

8. The system of claim 7, wherein the enable circuits are to generate a phase lock signal to indicate that all the RTWOs are powered on and phase locked.

9. The system of claim 7, wherein the individual RTWOs include one or more tunable capacitors coupled to the resonant rings of the respective RTWO, and wherein the system further comprises frequency tuning circuits coupled to respective RTWOs to:

detect a frequency mismatch associated with the respective RTWO; and control the tunable capacitors based on the detected frequency mismatch.

10. The system of claim 9, further comprising a ready circuit to:

receive a phase lock signal from the enable circuits;

receive a frequency lock signal from the frequency tuning circuits; and generate a ready signal based on the phase lock signal and the frequency lock signal.

11. The system of claim 1, wherein the resonant rings include resonant rings of at least a first ring topology and a second ring topology that are different from one another.

12. The system of claim 11, wherein the first ring topology is to generate a first clock signal and the second ring topology is to generate a second clock signal, wherein the second clock signal is a frequency scaled version of the first clock signal.

13. The system of claim 12, further comprising a transistor coupled between the first and second ring topologies to selectively short the first and second ring topologies together.

14. The system of claim 11, wherein the resonant rings of the first and second ring topologies overlap with one another within the base die in a horizontal direction.

15. The system of claim 2, wherein at least one of the RTWOs further includes one or more switches, wherein individual switches are coupled between the respective one or more pairs of inverters and the first ring or the second ring, wherein the switches are to selectively uncouple the respective one or more pairs of inverters from the first ring or the second ring to selectively power gate the respective RTWO.

16. The system of claim 1, wherein the RTWOs are operable in a traveling wave mode and a standing wave mode.

17. The system of claim 16, wherein the RTWOs include one or more switches coupled between the first ring and the second ring of the respective RTWOs, wherein the switches are to be closed when the RTWOs are in the standing wave mode and are to be open when the RTWOs are in the traveling wave mode.

18. An interposer comprising:

a resonant ring structure that includes a plurality of resonant rings coupled to one another to form a resonant oscillator array (ROA), wherein at least some resonant rings of different RTWOs are shorted to one another at respective shorting locations to form the ROA;

pass gates to selectively short respective pairs of the resonant rings to one another;

one or more enable circuits, wherein individual enable circuits are to control respective sets of one or more of the pass gates; and tap points coupled to the resonant ring structure to provide synchronized clock signals with deterministic phase points.

19. The interposer of claim 18, wherein the synchronized clock signals are to be provided to two or more dies.

20. The interposer of claim 18, wherein the resonant rings form a plurality of RTWOs that include a first ring and a second ring that are cross-coupled to one another, wherein the RTWOs further include one or more pairs of cross-coupled inverters that are coupled between the first ring and the second ring.

21. The interposer of claim 20, wherein the inverters are included in the interposer.

22. The interposer of claim 20, wherein the inverters are included in one or more dies that are to be coupled to the interposer to receive the synchronized clock signals.

* * * * *